(12) United States Patent
Kira

(10) Patent No.: US 8,000,521 B2
(45) Date of Patent: Aug. 16, 2011

(54) STEREOSCOPIC IMAGE GENERATING METHOD AND APPARATUS

(76) Inventor: Masataka Kira, Yokohama (JP)

(*) Notice: Subject to any disclaimer, the term of this patent is extended or adjusted under 35 U.S.C. 154(b) by 478 days.

(21) Appl. No.: 10/562,926

(22) PCT Filed: Jun. 24, 2005

(86) PCT No.: PCT/JP2005/011593
§ 371 (c)(1), (2), (4) Date: Dec. 30, 2005

(87) PCT Pub. No.: WO2006/001361
PCT Pub. Date: Jan. 5, 2006

(65) Prior Publication Data
US 2006/0158730 A1    Jul. 20, 2006

(30) Foreign Application Priority Data

Jun. 25, 2004 (JP) ................... 2004-188949
Nov. 2, 2004 (JP) ................... 2004-319878

(51) Int. Cl.
*G06K 9/00* (2006.01)
(52) U.S. Cl. ........ 382/154; 382/173; 382/254; 382/255; 382/275; 382/294; 359/462
(58) Field of Classification Search ................ 382/154, 382/173, 178, 181, 254, 255, 275, 266, 276, 382/294; 359/462
See application file for complete search history.

(56) References Cited

U.S. PATENT DOCUMENTS

| 4,825,393 A | * | 4/1989 | Nishiya .................. 702/152 |
| 5,825,539 A | | 10/1998 | Hoshi |
| 6,023,263 A | * | 2/2000 | Wood ...................... 345/581 |
| 6,157,733 A | * | 12/2000 | Swain ...................... 382/154 |
| 6,215,899 B1 | * | 4/2001 | Morimura et al. ........ 382/154 |
| 6,269,175 B1 | | 7/2001 | Hanna et al. |
| 6,324,001 B2 | * | 11/2001 | Tabata .................... 359/462 |

(Continued)

FOREIGN PATENT DOCUMENTS

JP    A-05-316541    11/1993

(Continued)

OTHER PUBLICATIONS

Hiroshi Inoue; *I Search a Wonder Stereoscopic-Vision*; Optronics Co.; Feb. 14, 1999; pp. 5-6. (with translation).

(Continued)

*Primary Examiner* — Matthew C Bella
*Assistant Examiner* — Eric Rush
(74) *Attorney, Agent, or Firm* — Oliff & Berridge, PLC

(57) ABSTRACT

To mitigate binocular rivalry involved in stereoscopic vision, and to alleviate the fatigue of an observer. In binocular vision, a fused point corresponding to a point b in a left visual image 320 is a point a of a right visual image 321. Since the left eye 200 and right eye 201 look at different objects, the binocular rivalry occurs when looking at the point b with the two eyes. Although the point b on the left visual image 320 is a sharp image, the point a on the right visual image 321 is an out-of-focus image. As a result, the image of the sharp point b is perceived first, and a subject B at the same distance is also perceived first. Thus, the out-of-focus point a and the image of the peripheral subject A become a removed image.

31 Claims, 23 Drawing Sheets

U.S. PATENT DOCUMENTS

| | | | |
|---|---|---|---|
| 6,449,309 B1 * | 9/2002 | Tabata | 375/240.01 |
| 6,714,672 B1 | 3/2004 | Berestov et al. | |
| 7,116,323 B2 * | 10/2006 | Kaye et al. | 345/419 |
| 2002/0191841 A1 * | 12/2002 | Harman | 382/154 |
| 2003/0190072 A1 * | 10/2003 | Adkins et al. | 382/154 |
| 2005/0089212 A1 * | 4/2005 | Mashitani et al. | 382/154 |
| 2005/0129325 A1 * | 6/2005 | Wu | 382/254 |
| 2005/0232510 A1 * | 10/2005 | Blake et al. | 382/275 |

FOREIGN PATENT DOCUMENTS

| | | |
|---|---|---|
| JP | A-06-133339 | 5/1994 |
| JP | A-08-029725 | 2/1996 |
| JP | A-09-322199 | 12/1997 |
| JP | A-10-239634 | 9/1998 |
| JP | A-2002-524937 | 8/2002 |
| JP | A-2003-284093 | 10/2003 |
| JP | A-2006-129016 | 5/2006 |
| WO | WO 00/13142 A1 | 3/2000 |
| WO | WO 00/13423 A1 | 3/2000 |

OTHER PUBLICATIONS

Japanese photographic measurement academic circles; *A Point of View of a Stereograph, Way of Talking, Way of Making*; Gihodo Publication Incorporated Company Co.; Apr. 25, 1980; pp. 3-4. (with translation).

Iwanami lecture; "Information Processing of an Image and Space"; Nov. 29, 2000; 26pgs. (with translation).

Japanese Official Notice of Rejection for Patent Application No. 2004-319878 dated Oct. 6, 2010 w/English Translation.

Japanese Official Notice of Rejection for JP Patent Appln. No. 2004-319878, mailed Dec. 10, 2010 w/English translation.

European Search Report issued in Application No. 05753437.2 on May 10, 2011.

* cited by examiner

STEREOSCOPIC IMAGE GENERATING METHOD AND APPARATUS

TECHNICAL FIELD

The present invention relates to a stereoscopic image generating method and apparatus, and more particularly to a stereoscopic image generating method and apparatus capable of increasing a stereoscopic effect or reducing the binocular rivalry of binocular parallax stereoscopic vision.

BACKGROUND ART

The binocular parallax stereoscopic vision, which creates a three-dimensional effect according to the disparity between parallax images of a left-eye image and a right-eye image, is a technique in which an observer observes the left-eye image with the left eye and the right-eye image with the right eye at the same time, senses a disparity by mixing the two images in the brain, and perceives the depth from the degree of the disparity. The left-eye and right-eye images for the binocular parallax stereoscopic vision are produced by taking pictures with cameras placed at the left eyepoint and right eyepoint, respectively. Usually, the left and right images for the binocular stereoscopic vision are produced by taking pictures with a stereo camera or two cameras placed apart in a horizontal direction, in which case the depth of field at the photography is burned into the images. When proper focus is achieved for all the positions, the depth of field is burned as infinity. The images can also be taken twice with a single camera with moving the eyepoint.

Recently, the images can be produced by three-dimensional computer graphics (3D CG). Since the 3D CG simulates a real photographic system, when the left and right images are produced by the 3D CG, the term "photography" will be used below.

As for the left and right images thus produced, the quality of the images is decided by the performance the photographic means (camera or 3D CG-generating apparatus) originally has and its set conditions. The quality of the images refers to optical characteristics of the camera and lenses such as setting of the depth of field, focus position, focal length, composition and zoom (angle of view); chemical characteristics such as film and photosensitive emulsion; and characteristics of a photosensitive device such as a CCD, which are reflected on the images taken. As for the optical characteristics among them, the image is focused on a particular part of a subject in a normal photograph.

Generally, the setting conditions of the left and right images for the stereoscopic vision are set at approximately the same conditions except for the eyepoints at the photography, which are the same in the 3D CG. For example, when photographing with two cameras, pictures are taken using the same type of the cameras, lenses and films at the same exposure, at the same shutter speed, and at the same zooming. The left-eye image and right-eye image can be utilized as a single image for normal vision, and the individual images are completely the same image as the normal image (single image) taken form a single point of view.

(Binocular Rivalry)

In the binocular stereoscopic vision that observes the images having parallax with two eyes, there is a problem in that the focal adjustment is not effectively made because the observed images are flat. Apart from this problem, a simple stereoscopic vision, in which the left eye observes the left-eye image (normal photograph) taken from the left eye position, and the right eye observes the right-eye image (normal photograph) taken from the right eye position, will provide a very unnatural visual effect to a person who observes the external world binocularly in the real world. This is one of the reasons why the existing stereoscopic vision causes fatigue. Since the user is compelled to view the images based on the single lens with the two eyes, it is unavoidable that the unnatural feeling by the binocular stereoscopic vision is increased. In particular, using images such as photographic images that achieve focus in a wide range as the images for the stereoscopic vision, the unnatural feeling becomes conspicuous.

When this grows worse, many regions that are not mixed through the left and right eyes are perceived, so that binocular rivalry that perceives different visual images with the two eyes occurs, and the brain perceives disturbed, wavering images. Human beings primarily have a function to reduce the binocular rivalry when observing an object binocularly in the real world, which will be described in detail later.

(Application of Depth of Field of Stereoscopic Image)

One of the functions of reducing the binocular rivalry is a function based on the depth of field provided for the human eyes which observe an object in the real world in which the focal adjustment works effectively. Even in the case of the stereoscopic vision that observes images for the binocular stereoscopic vision, it is also possible to utilize the function by controlling the out-of-focus quantity that appears in the contents of the images for the stereoscopic vision. When observing the images for the binocular stereoscopic vision, the position of the focal adjustment of an observer is on the images for the binocular stereoscopic vision, in which case the focal adjustment of the eyes does not function effectively.

To display the left and right images for the stereoscopic vision without having the depth of field on a display (HMD in the technique), a technique is proposed which detects the position the observer of the displayed images gazes at, provides the depth of field to the displayed images according to the detected position, adjusts the focus on the gazing point when the gazing point moves, and provides the depth of field to the images using the new gazing point as a reference point (for example, see patent document 1).

Thus, as for the left and right images for the stereoscopic vision without the depth of field (in which the focus is achieved allover), the images with the depth of field are displayed by changing the reference point of applying the depth of field according to the movement of the gazing point of the observer.

The foregoing technique of applying the depth of field to the images has the following problems. It takes a long time for detecting the gazing position of the observer and for correcting the display image, and has a difficulty in achieving a natural view. In addition, an error of detecting the gazing position will result in excess eye fatigue. Furthermore, it is difficult to prepare the left and right images for the stereoscopic vision without the depth of field (in which the focus is achieved allover) and a depth map (an image that represents the distance from the eyepoint to the subject by gray levels). Thus, they cannot be obtained by ordinary cameras, and hence the apparatus becomes complicated, expensive and only a single person can view.

Moreover, to mix the left and right images for the stereoscopic vision having large parallax, they have too large a disparity, become images with a lot of binocular rivalry, and increase the physiological load of the stereoscopic vision observer. This will result in eye fatigue and pain, nausea and headaches.

The present invention is implemented to solve the foregoing problems. Therefore it is an object of the present invention to mitigate the binocular rivalry caused by the stereoscopic vision, and to reduce the fatigue of the observer.

Patent document 1: Japanese patent application Laid-open No. 10-239634/1998.

Non-patent document 1: Hiroshi Inoue, "Explore the mysteries of stereoscopic vision" (The Optronics Co., Ltd., Published January 1999).

Non-patent document 2: Japan Society of Photogrammetry and Remote Sensing, "Method of viewing, taking and creating stereoscopic photograph" (Gihodo Shuppan Co., Ltd.).

Non-patent document 3: "Information processing of images and space", Iwanami Lectures, Multimedia Information Science.

DISCLOSURE OF THE INVENTION

The present invention is implemented considering these objects. A stereoscopic image generating method in accordance with the present invention is a stereoscopic image generating method having a left image and a right image for stereoscopic vision and comprising: a target region extraction step of extracting left and right target regions which do not include a pair of fused points corresponding to each other in the left image and the right image which are displayed on a display plane; and a removed region extraction step of extracting a more inconspicuous region as a removed region by identifying the more inconspicuous region between the left and right target regions, or further comprising a removed region processing step. It is also possible to cause a program to execute the method, and to store the program for executing it in a computer readable medium.

In addition, a stereoscopic image generating apparatus in accordance with the present invention is a stereoscopic image generating apparatus having a left image and a right image for stereoscopic vision and comprising: target region extraction means of extracting left and right target regions which do not include a pair of fused points corresponding to each other in the left image and the right image which are displayed on a display plane; and removed region extraction means of extracting a more inconspicuous region as a removed region by identifying the more inconspicuous region between the left and right target regions, or further comprising removed region processing means.

Furthermore, a stereoscopic viewing method in accordance with the present invention is a stereoscopic viewing method of watching a stereoscopic image having a left image and a right image for stereoscopic vision and comprising: a target region extraction step of extracting left and right target regions which do not include a pair of fused points corresponding to each other in the left image and the right image which are displayed on a display plane; and a removed region extraction step of extracting a more inconspicuous region as a removed region by identifying the more inconspicuous region between the left and right target regions, or further comprising a removed region processing step.

Moreover, a stereoscopic viewing apparatus for showing a stereoscopic image in accordance with the present invention is a stereoscopic viewing apparatus for showing a stereoscopic image having a left image and a right image for stereoscopic vision and comprising: target region extraction means of extracting left and right target regions which do not include a pair of fused points corresponding to each other in the left image and the right image which are displayed on a display plane; and removed region extraction means of extracting a more inconspicuous region as a removed region by identifying the more inconspicuous region between the left and right target regions.

BEST MODE FOR CARRYING OUT THE INVENTION

To accomplish an object of the present invention, a principle of mitigating the binocular rivalry will be described first. First, the binocular rivalry takes place only in exceptional cases when looking at entirely different images with the left and right eyes as in a laboratory. As for a pair of images for the binocular parallax stereoscopic vision, the binocular rivalry occurs or does not occur at different degrees in individual regions.

In view of this, the following definitions are made as to the binocular rivalry.

"A region where the binocular rivalry occurs" is defined as a region that has no corresponding fused point to the left and right eyes.

"That the binocular rivalry is mitigated" or "that the binocular rivalry is reduced" is defined as the cooling down of the binocular rivalry, as a result of which the load on the eyes of the observer is reduced and the fatigue is lessened.

"That the binocular rivalry becomes conspicuous" is defined as the intensifying of the binocular rivalry, as a result of which the image is seen wavering, which deteriorates the perception of a stable image and increases eye fatigue.

Generally, the term "binocular rivalry" refers to an unstable perceptive phenomenon that takes place when looking at images having a low correlation between them with the left and right eyes. In the present invention, however, since the binocular rivalry is considered as a matter of degree, the foregoing definitions are made.

(Depth of Field and Out-of-Focus)

Next, the relationship between the depth of field and the out-of-focus appearing in an image will be described. When the observer observes the outside world in the real world, focus is adjusted on the periphery of the gazing point of the observer. As a result, the gazing point is viewed sharply, and the forward and backward portions thereof are seen out-of-focus. The out-of-focus quantity increases with the distance from the position of the focus, which is the occurrence of the so-called out-of-focus corresponding to the depth of field.

Figure 1A:
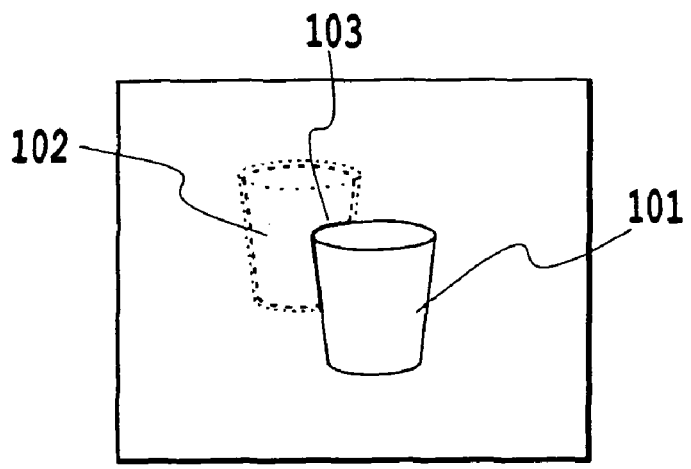
FIG. 1A is a view showing an image including both portions where the focal adjustment is achieved and not achieved.

As for the out-of-focus, there is not only the out-of-focus of a part of an object, but also a phenomenon that contours of the object become out-of-focus and erode region of an object behind. It will be described with reference to FIGS. 1A and 1B. FIG. 1A is a view showing an image in which the focus is adjusted on a glass 101. A back glass 102, which is separated in the depth direction, is out of focus. The out-of-focus is indicated by broken double lines, and the space between the two lines indicates the degree of the out-of-focus.

The front glass 101 and the back glass 102 have a hidden and overlapped relationship (the phenomenon in which a back object is concealed by a front object, and the concealed portion is not seen). At the overlapped portion 103 of the glass 101 and glass 102, the contours of the glass 101 appear sharp, and the regions of the out-of-focus of the glass 102 are cut off sharp by the contours of the glass 101.

In this way, when the focus is adjusted on the front object and the back object is out of focus, the out-of-focus at the back does not protrude from or erode the contours of the front object. Although the contours of the portion 103 is drawn in thick lines in FIG. 1A, the contours do not mean that only their portion is sharp, but are drawn to emphasize the tangent between the glass 101 and glass 102.

As for the sharpness, the contours of the glass 101 are substantially equal allover.

Figure 1B:
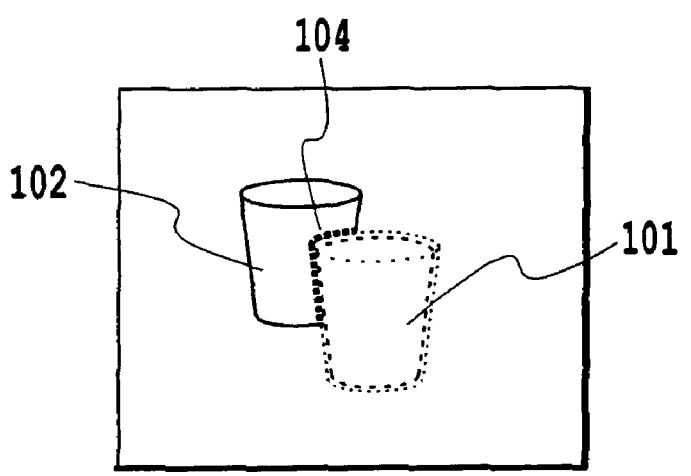
FIG. 1B is a view showing an image including both portions where the focal adjustment is achieved and not achieved.

FIG. 1B is a view showing an image in which the focus is adjusted on the glass 102. Since the front glass 101 is separated forward from the focus, it is out of focus. The glass 101 and the glass 102 have a hidden and overlapped relationship. In the overlapped portion 104 of the glass 101 and glass 102, the region of the out-of-focus of the glass 101 protrudes from and erodes the contours of the glass 102.

Thus, when the focus is adjusted on the back object and the front object is out of focus, the out-of-focus of the front object protrudes from and erodes the region in which the back object is seen sharp. Although the portion 104 is drawn by thick broken lines in FIG. 1B, the thick broken lines do not mean that only this portion is particularly out of focus, but are drawn only to emphasize the out-of-focus of the portions in which the glass 101 makes contact with the glass 102.

In addition, when both the glasses are out of focus, the front out-of-focus erodes the out-of-focus of the back object. In contrast, when both the glasses are sharp, the boundaries are separated sharply. The hidden and over lapped portion and the out-of-focus have such interaction.

(Role of Out-of-Focus at Binocular Observation)

The phenomenon of the out-of-focus caused by the focal adjustment serves to reduce the binocular rivalry when observing the outside world binocularly. In everyday life, it is rare that the binocular rivalry occurs so markedly as to hamper the brain of a person from fusing the images, and that the person perceives disturbed images of the outside world. This is because when the left and right eyes look at different objects, the image of one of the eyes goes out of focus well so as to prevent the binocular rivalry from becoming conspicuous. Since the image of one of the eyes falls out of focus, although the left and right eyes perceive different images, the image clearly seen gains superiority to the image out of focus, and the former is selected quickly so that the binocular rivalry is mitigated.

Thus, when the degree of the out-of-focus is obvious, a decision is made instantaneously that the image clearly seen is an "image viewed" and the image out of focus is an "image unviewed". In this case, the image out of focus is naturally an "inconspicuous image" for the observer.

However, since the depth of field is proportional to the distance, when the difference in distance is small, the difference in the degree of the out-of-focus is small, and when the difference in distance is minute, a region in which the binocular rivalry occurs is narrow from the geometrical viewpoint. In addition, since the human eyes have a shallow depth of field, it is rare that the binocular rivalry becomes conspicuous when the binocular rivalry takes place because of the hidden and over lapped relationship as will be described later. Thus, the out-of-focus plays an important role for easing the binocular rivalry.

Generally, since the human eyes have the depth of field shallower than that of photographs and CG, the out-of-focus occurs more often. The shallower depth of field can achieve the focus in a narrower range when looking at a particular position. The greater depth of field, which enables focusing in a wider range, causes a variety of things to be seen clearly so that it is inconvenient to look at that very portion.

Compared with cameras, the human beings have a much shallower depth of field. To compensate for it, the human eyes are able to move the gazing point more frequently in a shorter time. Since they can move the focal position in real time, they do not need visual images with the deep depth of field. The shallow depth is advantageous to look at a particular position.

On the other hand, the phenomenon of the out-of-focus due to the depth of field can also occur in photographs so that the portion to which the focus is adjusted by the focal adjustment is taken sharply, but the portion to which the focus is not adjusted appears as the out-of-focus in the image with a blur. The front and back sides of the subject to which the focus is adjusted are greatly out of focus in proportion to the distance from the focal position. However, cameras made on the model of the human eyes usually take images with a considerable depth of field with little out-of-focus except for special techniques. This is because unlike the human eyes, they cannot change the focal position in real time in the image, and in addition, images including a lot of out-of-focus portions have low practical utility as a photograph.

Although the human eyes and cameras differ in this way, the property of the out-of-focus due to the depth of field bears striking resemblance in that the out-of-focus increases in proportion to the distance from the focal position at the front and back sides of the position to which the focus is adjusted. Since the images taken by the cameras have a considerable depth of field, when they are used as the left and right images for the stereoscopic vision, a stereoscopic vision observer observes the photographs taken. Accordingly, there is a tendency to reduce the out-of-focus quantity, and to make the binocular rivalry more conspicuous.

The present invention is conceived to circumvent this very problem: To reduce the binocular rivalry occurring when using the images taken with cameras or the like as the left and right images for the stereoscopic vision, the present invention carries out processing and amendment to make image regions to be removed more inconspicuous in the regions where the binocular rivalry occurs.

(Binocular Rivalry and Out-of-Focus)

The relationship between the binocular rivalry and the out-of-focus will be described in reference to the drawings. In the accompanying drawings other than FIGS. 1A and 1B, since the out-of-focus cannot be represented correctly, the degree of the out-of-focus is represented by the thickness of lines and broken lines, and by single lines. The thick lines represent a state in which the focus is adjusted, and the broken lines represent a state that is out of focus. The thickness of the lines indicates the out-of-focus quantity (width). The thinner, the greater the out-of-focus quantity (width).

Figure 2:
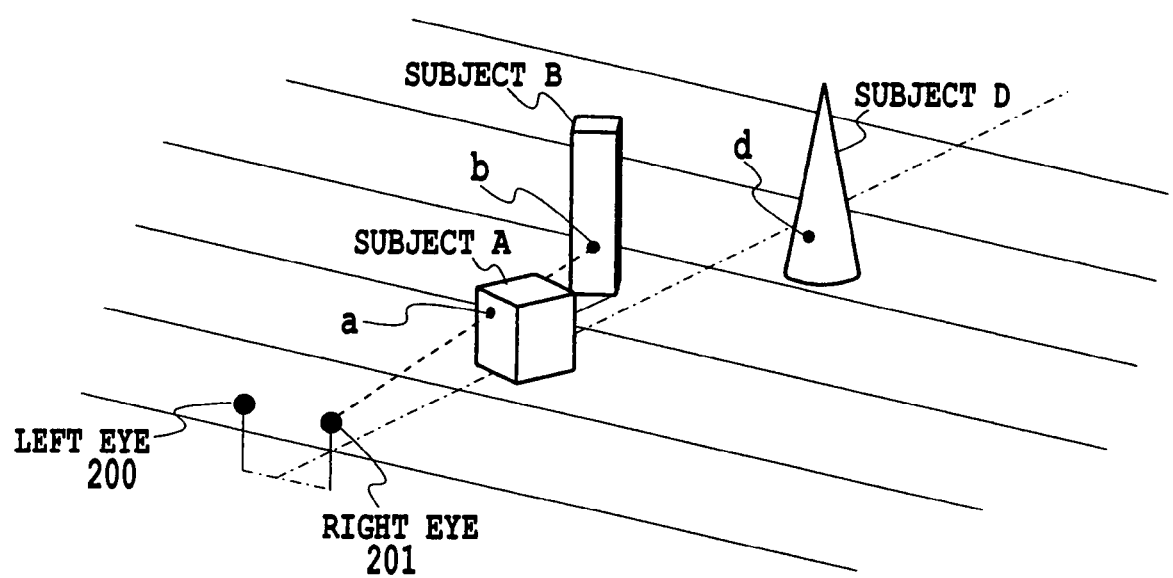
FIG. 2 is a view showing a state in which a plurality of objects of an embodiment in accordance with the present invention are placed with hidden and overlapped relationships.

Considering the conditions in which the binocular rivalry occurs, it frequently occurs when a plurality of objects have hidden and overlapped relationships, and a back object is viewed with only one eye. FIG. 2 is a view showing a state in which a plurality of objects of an embodiment in accordance with the present invention are placed with having the hidden and overlapped relationships. From the eyepoints of the left eye 200 and right eye 201, a subject A, a subject B and a subject D are placed in sequence in the depth direction, and a point a is placed on the subject A. The point a is a point of intersection of the subject A and the line connecting the right eye 201 to a point b on the subject B, which is placed at a position visible from the observer. The point b is on the subject B, and the point b and the lower half of the subject B are invisible when observed from the right eyepoint 201 because they are hidden by the subject A.

A point d is on the subject D, and the point d and the lower half of the subject D are invisible when observed from the left eyepoint 200 because they are hidden by the subject A.

(Regions Removed by Binocular Rivalry)

Figure 3A:
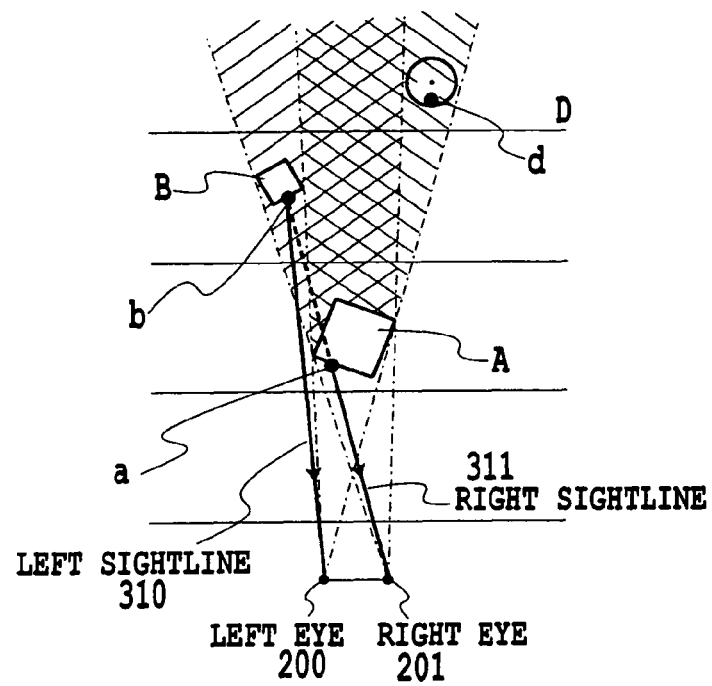
FIG. 3A is a view showing a case where the point b is looked at in a plan view of FIG. 2.

FIG. 3A is a plan view of FIG. 2, which shows the case in which the point b is gazed at. The left eye 200 adjusts the focus on the point b and looks at the point b on the subject B. However, it cannot view the subject D or point d because they are concealed by the subject A except for the upper half of the subject D. The right slope hatching indicates the region invisible from the left eye 200.

Although the right eye 201 also gazes at the point b, since it cannot see the point b because of the blocking by the subject A, it looks at the point a which is at the intersection of the right line of vision 311 and the subject A. The point a becomes the corresponding point of the right eye 201, which corresponds to the point b the left eye 200 looks at. The left slope hatching indicates the region invisible from the right eye 201.

The region in which the right slope hatching and the left slope hatching intersect indicates the region invisible from the left eye 200 and right eye 201.

Figure 3B:
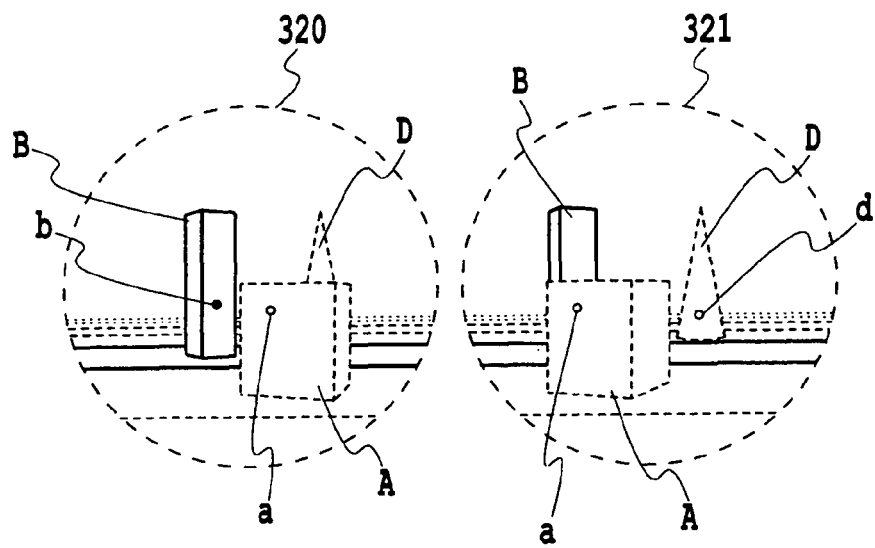
FIG. 3B is a view showing left and right visual images of the embodiment.

The foregoing will be described in terms of a left visual image 320 of the left eye 200 (in a word, the left eye views as such), and a right visual image 321 of the right eye 201 (in a word, the right eye views as such). FIG. 3B is a view showing the left and right visual images of an embodiment.

As for the left visual image 320, since the left eye 200 is focused on the point b on the subject B, the subject B and point b are viewed sharpest. Then the subject D remoter than the subject B falls out of focus in proportion to the distant from the subject B. Here, the lower half of the subject D and the point dare invisible because of the blocking of the subject A. Since the subject A and point a are placed in front of the subject B, they fall out of focus in proportion to the distance from the subject B.

As for the right visual image 321, although the right eye 201 is focused on the point b on the subject B, the point b is invisible because of the blocking of the subject A. Since the upper half of the subject B is visible, that portion can be seen sharpest. The point a, which is on the right line of vision connecting the right eye 201 to the point b, is in front of the point b. Thus, the point a falls out of focus, and the subject A at the same distance is also seen out of focus. The subject D and point d, which are at the right back of the subject B, are seen out of focus in proportion to the distance from the subject B.

As described above, when viewed binocularly, the fused point corresponding to the point b of the left visual image 320 is the point a of the right visual image 321. Since the left eye 200 and the right eye 201 look at the different images, the binocular rivalry occurs when gazing at the point b binocularly.

Although the point b on the left visual image 320 is a sharp image, the point a on the right visual image 321 is an out-of-focus image. As a result, the sharp image of the point b becomes an image perceived primarily, and the subject B at the same distance also becomes an image perceived primarily. As for the point a and the peripheral subject A, which are out of focus, that is, the region which includes the point a and is substantially the same distance as the distance between the point a and the eyepoint, since they are inconspicuous images, they are removed easily, and the binocular rivalry is reduced. Here, the term "substantially the same distance" refers to the distance of an order that includes the main portion of the subject (the subject A in this case).

In this way, the human eyes can make focal adjustment in the three-dimensional world. Accordingly, when the binocular rivalry occurs as in the case when observing the subjects overlapped in the depth direction as shown in FIGS. 3A and 3B, since the out-of-focus of the image generated as a result of the focal adjustment occurs in only one side of the images, it becomes easy to remove the inconspicuous image and to select the image given priority by the binocular rivalry.

When considering the case geometrically in which the point b is close to the point a and the distance between the point b and point a is very short, the region in which the binocular rivalry occurs is narrow. In addition, since the human eyes have a shallow depth of field, it is rare that the binocular rivalry becomes conspicuous when such a clear hidden and overlapped relationship is present.

Thus, the principle is assumed to be true that when the front subject (subject A) is seen out of focus, and when the back subject (subject B), which is concealed by the front object (subject A) when looked at with one of the eyes, is visible sharper than the front subject (subject A), the observer does not look at the front subject (subject A). The present embodiment employs the principle.

In other words, when the back subject (subject B) is visible in only one of the visual images, is concealed by the front subject (subject A) in the other of the visual images, and is sharper than the front subject (subject A), the back subject (subject B) is a visual image on the hidden side, and the portion of the front subject (subject A) which conceals the back subject (subject B) is the portion (region) removed by the binocular rivalry. Here, the neighborhoods of the point a and point b are target regions in the present invention, and the portion removed from the target regions according to the foregoing decision becomes are moved region.

Figure 4A:
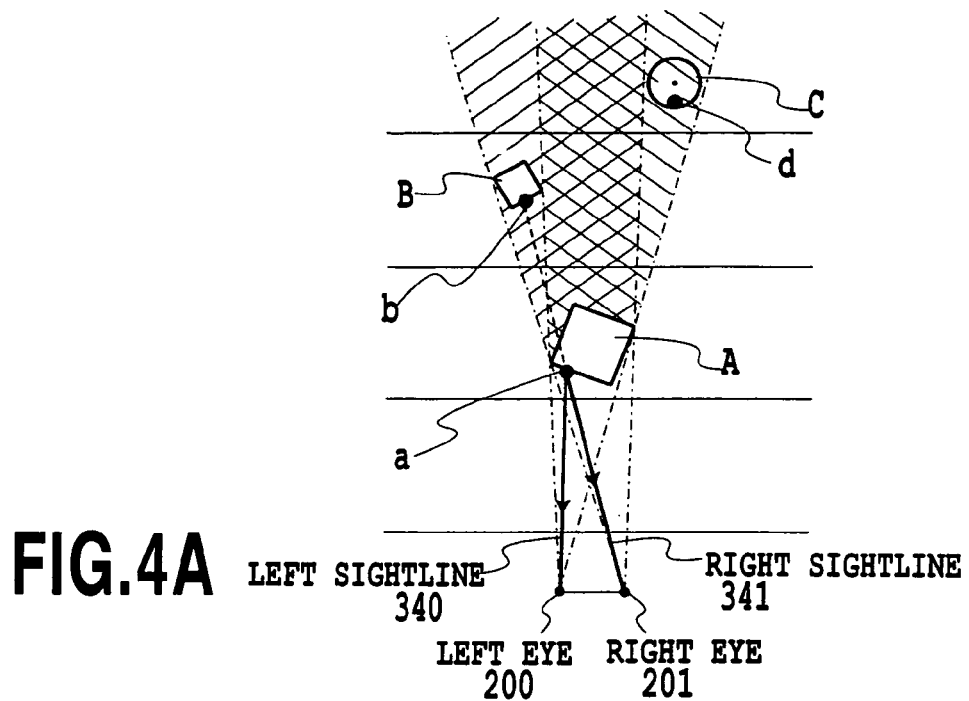
FIG. 4A is a view showing a case where the point a is looked at in a plan view of FIG. 2.

Next, the case in which the point a is gazed at binocularly will be described. FIG. 4A is a plan view illustrating the case when gazing at the point a in an embodiment. The left eye 200 and right eye 201, which gaze at the point a on the subject A, focus on the point a. Since nothing conceals the point a, it is visible binocularly.

Although the left eye 200 gazes at the point a on the subject A with focusing on it, the subject D and point d are invisible except for the upper half of the subject D because of the concealment by the subject A. Likewise, although the right eye 201 gazes at the point a on the subject A with focusing on it, the subject B and point b are invisible because of the concealment by the subject A. As for the hatchings, since they are the same as those of FIG. 3A, their description is omitted here.

Figure 4B:
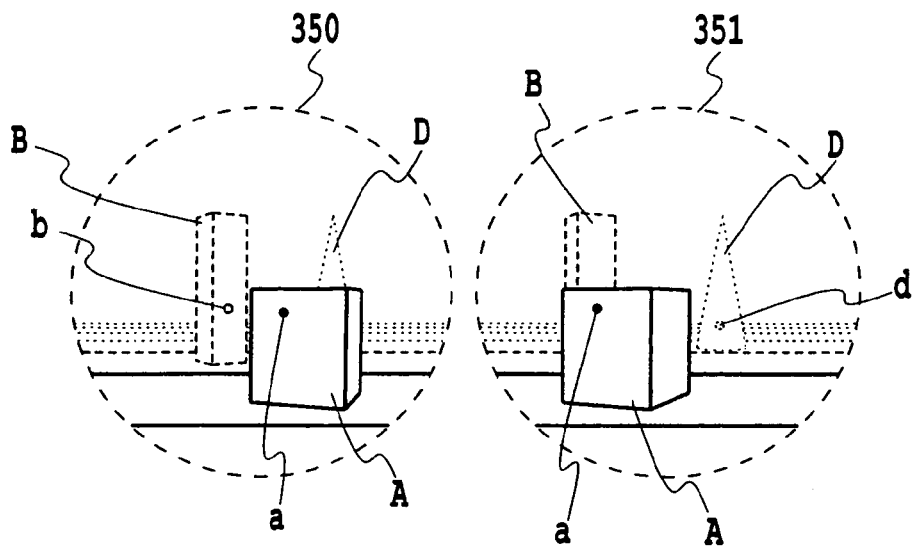
FIG. 4B is a view showing left and right visual images of the embodiment.

FIG. 4B is a view showing the left visual image 350 and right visual image 351. As for the left visual image 350, since the left eye is focused on the point a on the subject A, the point a and subject A are seen most sharply, and the subject B and subject D are seen out of focus in sequence in proportion to the distance from the eyepoint. Although the subject B and point b are visible, the lower half of the subject D and the point d are invisible because of the blocking of the subject A.

As for the right visual image 351, since the right eye is focused on the point a on the subject A as in the case of the left visual image 350, the point a and subject A are seen most sharply, and the subject B and subject D are seen out of focus in sequence in proportion to the distance from the eyepoint. Although the lower half of the subject B and point b are invisible because of the blocking of the subject A, the subject D and point d are visible.

As described in connection with FIG. 4A, the point corresponding to the point a on the right visual image 351 is the point a or point b on the left visual image 350. Without considering the focus and vergence angle, either of the points is selectable. However, the point a in the left visual image 350 is clearly seen because the focus is adjusted on it, and the point b is seen out of focus because the focus is not adjusted on it. Accordingly, the image of the point b out of focus and its peripheral subject B, that is, the region which includes the point b and is located at substantially the same distance as the distance between the point b and the eyepoint becomes the image or region to be removed.

Thus, considering the left and right visual images, the point a in the right visual image 351 and the point b in the left visual image 350 are points at which the binocular rivalry can occur. However, since one of them is out of focus, and the image out of focus becomes the region not seen, the binocular rivalry reduces. When the point b is close to the point a, and the distance between the point b and point a is very short, the description in connection with FIG. 3B holds true.

Thus, the principle is assumed to hold true that when the front subject (subject A) is seen clearly, and when the back subject (subject B), which is concealed by the front object (subject A) only when looked at with one of the eyes, is seen out of focus, the observer looks at the front subject (subject A). The present embodiment employs the principle.

In other words, when the back subject (subject B) is visible in only one of the visual images, and is concealed by the front subject (subject A) in the other of the visual images, and when the front subject (subject A) is seen sharper, the portion of the back subject (subject B), which is on the visual image on the side capable of viewing the back subject (subject B) and which is concealed by the front subject (subject A) in the other image, is the portion (region) removed by the binocular rivalry.

(Extraction of Target of Region and Identification of Removed Region)

The summary of the facts verified with reference to FIGS. 3A and 3B and FIGS. 4A and 4B is as follows: The focused position and the out-of-focus of the image have interrelationship; the region (target region) in which the binocular rivalry occurs is extracted first by comparing the hidden and overlapped relationships and the out-of-focus quantities; and the region where the binocular rivalry occurring at the binocular viewing is given priority and the region to be removed are identified. In other words, the following principles are discovered.

[Principle 1]

When a region X is on this side of a region Y and they have the hidden and overlapped relationship, and when one of the eyes that can view the region Y gazes at the region X more blurredly than the region Y, the observer does not gaze at the region X (gazes at the region Y).

[Principle 2]

When a region X is on this side of a region Y and they have the hidden and overlapped relationship, and when the region X is visible more sharply than the region Y, the observer does not gaze at the region Y (gazes at the region X).

Since the foregoing principles hold, they are applied to the binocular stereoscopic vision to extract the target region in which the binocular rivalry occurs between the left and right-images for the stereoscopic vision, and to identify and extract the region to be removed.

Extraction method derived from Principle 1:

[Extraction Method 1]

When a region X is on this side of a region Y and they have the hidden and overlapped relationship, and when one of the eyes that can view the region Y looks at the region X more blurredly and more inconspicuously than the region Y, the region X is a region to be removed at the binocular rivalry.

Extraction method derived from Principle 2:
[Extraction Method 2]

When a region X is on this side of a region Y and they have the hidden and overlapped relationship, and when the region Y visible with only one of the eyes is more blurred and more inconspicuous than the region X, the region Y is a region to be removed at the binocular rivalry.

Here, the term "hidden and overlapped relationship" refers to a condition in which a part of a subject is invisible in one of the left and right images because of the concealment of another subject on this side of the subject when seen from the eyepoint.

First Embodiment

A concrete example employing the foregoing method of extracting the regions will be described with reference to FIGS. 5 and 6. Although in FIG. 3A, FIG. 3B, FIG. 4A and FIG. 4B, descriptions are made about the viewed states according to the depth of field of the human eyes when a person observes the subjects, FIG. 5A, FIG. 5B, FIG. 5C and FIG. 6 show a case where the same subjects are taken with a camera from the same eyepoint as that of FIG. 3A, FIG. 3B, FIG. 4A and FIG. 4B.

As described above, when images taken with a camera or the like are used as the left and right images for the stereoscopic vision in the binocular parallax stereoscopic vision, the photographs taken or images by CG are observed. The primary difference of observing the images from observing the outside world directly is that when observing the images, it is possible to observe an originally "unseen region", on which the focus is not adjusted, in the state of out of focus. More precisely, although the eyes of the observer are focused on the images, the image contents to be observed are out of focus. The object of the present invention is to reduce the binocular rivalry that occurs when looking at such images in the binocular parallax stereoscopic vision.

When shifting the focus on the blurred "unseen region" while observing the outside world by the naked eyes, the region instantaneously becomes the "viewed region" on which the focus is adjusted. In addition, the images such as photographs have a great depth of field and a small out-of-focus quantity. Although the degree of the out-of-focus cannot be represented properly in the drawings, the out-of-focus quantities represented by FIG. 5A, FIG. 5B and FIG. 5C are much smaller than the out-of-focus quantities represented by FIG. 3B and FIG. 4B. Besides, it is said that when observing an image having the depth of field, the gazing point of the observer moves on the image, and then shifts as if absorbed to the point on which the focus is adjusted unconsciously and stops at the point.

EXAMPLE 1

Figure 5A:
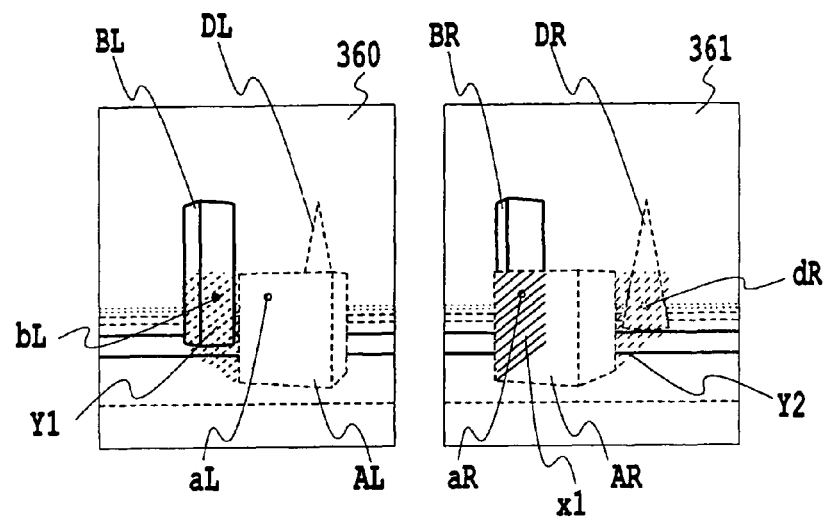
FIG. 5A is a view showing images obtained by transferring left and right eye images described with reference to FIGS. 3A and 3B.
Figure 6:
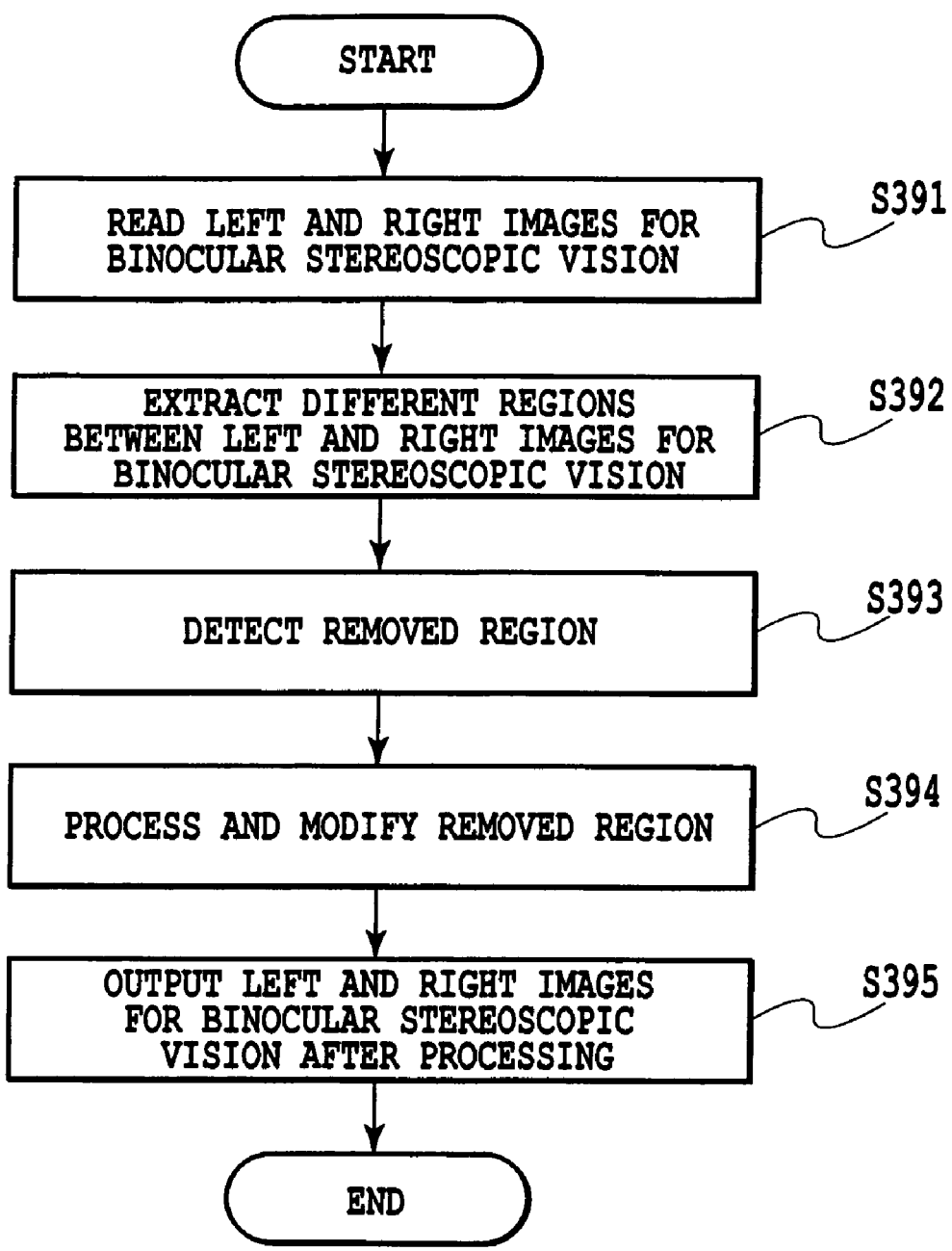
FIG. 6 is a flowchart illustrating a processing of the present embodiment.

FIG. 5A is a view showing images transferred from the left and right eye images described with reference to FIG. 3A. Referring to FIG. 5A, the extraction of the target region and the identification and extraction of the removed region using the foregoing extraction method 1 will be described. A left image 360 is an image photographed from the left eye 200, and subject images AL, BL and DL are images taken in the left image 360 when the subjects A, B and D are photographed from the left eye 200, respectively. Points aL and bL are images of the points a and b taken in the left image 360, respectively.

Likewise, a right image 361 is an image photographed from the right eye 201, and subject images AR, BR and DR are images taken in the right image 361 when the subjects A, B and D are photographed from the right eye 201, respectively. Points aR and bR are images of the points a and b taken in the right image 361, respectively. Although photographs and human visual images differ in the quantity of the out-of-focus, they are alike in the tendency. Accordingly, as for the same points as those in FIG. 3A such as the notation, their description will be omitted here.

Figure 5B:
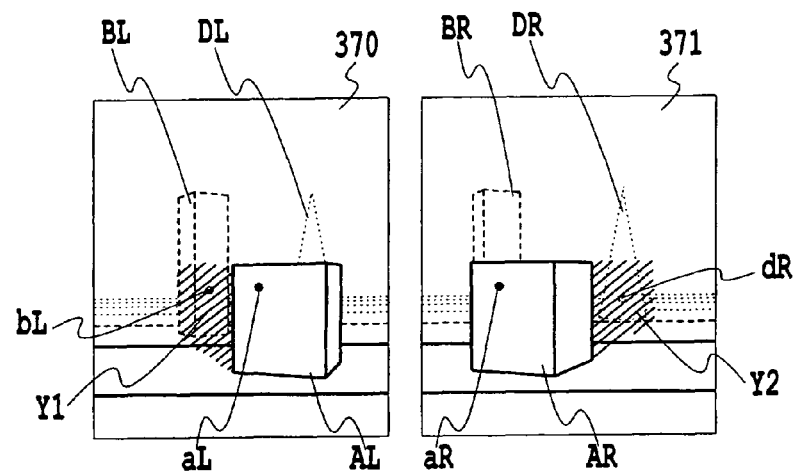
FIG. 5B is a view showing images obtained by transferring left and right eye images described with reference to FIGS. 4A and 4B.

It is assumed in FIGS. 5A and 5B that the out-of-focus of the subject A (represented by broken lines in AL and AR in the drawings), the out-of-focus of the subject B (represented by broken lines in BL and BR in the drawings), or the out-of-focus of the subject D (represented by broken lines in DL and DR in the drawings) have an out-of-focus quantity (intensity) of a degree that prevents the binocular rivalry from growing large. A case where the out-of-focus quantity (intensity) is small and hence the binocular rivalry becomes large corresponds to the case of FIG. 5C in which the focus is adjusted on both the subjects A and B.

Since the focus is adjusted on the point bL on the subject BL in the left image 360, the point bL and subject BL are sharp. In the right image 361, although the lower half of the subject BR and point bR (not shown) are invisible because of the concealment by the subject AR, since the point and region corresponding to them are visible in the left image 360, the region in the left image 360 is referred to as a region Y1 (represented by hatching of broken lines). The region is present only in the left image 360, and not in the right image 361. Accordingly, it is a region that can bring about the binocular rivalry.

Since the subject A is on this side of the subject B, it is more blurred than the subject B. In the right image 361, although the lower half of the subject BR and point bR are invisible because of the concealment by the subject AR, since the focus is adjusted on the subject BR, the subject AR and point aR are out of focus.

When taking the point bL in the left image 360 as a reference point, the fused point in the right image 361 is the point aR. When taking the point aR in the right image 361 as a reference point, the fused point in the left image 360 is the point bL or point aL. The point bL is sharp, and the point aL is out of focus.

First, the sharp point bL is given priority, and the point aR is selected as the fused point corresponding to the point bL. However, since the points differ in the left and right, the region is a target region in which the binocular rivalry occurs. Assume that the point bL and its periphery constitute the region Y1 (represented by hatching of broken lines), and the point aR and its periphery constitute a region X1 (represented by hatching of solid lines). Then, the region X1 in the right image 361 is more blurred than the region Y1 when employing the two images 360 and 361 as binocular parallax stereoscopic images for the stereoscopic vision. Thus, considering the contents of the images, the region X1 is a region unseen by the observer and becomes a region to be removed by the binocular rivalry.

As for the subject D, although the lower half of the subject DL is invisible because of the concealment in the left image 360, the lower half of the subject DL and the point dR are visible in the right image 361. The region that is present only in the right image 361 is referred to as a region Y2. Although the region in the left image 361 corresponding to the region Y2 in the right image is an upper portion of a right half of the subject AL, they are both out of focus. In such a case, the front side of the hidden and over lapped regions in the left image 361 is given priority except when the upper portion of the right half of the subject AL is extremely out of focus. Accordingly, the region Y2 is a removed region.

To extract the target region in the present embodiment, it is necessary to identify and extract which portion in the left image corresponds to which portion in the right image. To achieve this, an identifying method is used which is based on the pattern recognition known in the present technical field. Although the detailed description of the pattern recognition is omitted here, the identifying method enables the figures or the arrangement of pixels drawn in the left and right images to be recognized as patterns, and the points or regions corresponding to them are identified. In this specification including the other embodiments, the term "target region" in the present invention in which the binocular rivalry occurs is defined as follows: When a corresponding portion is found in only one of the left and right images as a result of the pattern recognition, the target region is defined as that region which is present in only one of the images and the portion corresponding to that region in the other of the images in the geometrical optics (as shown in FIG. 5A, FIG. 5B and FIG. 5C, a plurality of corresponding points can be present). In other words, when a particular image region is found in the left image but not in the right image as a result of identifying the image regions, the particular image region in the left image, and the image region in the right image corresponding to that region in the left image in the geometrical optics are the target regions.

Furthermore, according to the foregoing principle, an identification is made as to which of the left image and right image includes a region to be removed, and the identified region is extracted as a removed region. To consider the focal length more accurately in this case, since the removed region is a region on which the focal length of the observer is not adjusted in the original three-dimensional world, it is possible to analyze the left and right images of the stereoscopic vision three-dimensionally, and to decide the regions within a certain range from the eyepoint including the removed region as the removed region. In this case, the three-dimensional distance from the eyepoint is obtained by calculating the vergence angle at the point of interest from the left and right images in the present embodiment. Alternatively, the distance of the particular point from the eyepoint is obtained by preparing a depth map (an image representing the depth information in gray scale) in advance. However, not limited to these methods, any known methods in the present technical field are applicable.

In the present embodiment, the foregoing processing is carried out by executing a pattern recognition program known in the present technical field. Thus, the processing is carried out automatically by inputting the left and right images to a suitable computer, and by starting the program. Subsequently, a more inconspicuous region that is out of focus in the target regions is decided by similar pattern recognition technique.

EXAMPLE 2

Although the foregoing example 1 employs the pattern recognition technique and the program installing it to extract the target region, this is not essential. For example, any image processing techniques to which the principle of the present invention is applicable can be used. In the present example, one of the applicable techniques will be described.

As described above, the stereoscopic images used in the present invention can be generated by calculations by the computer program. In this case, the target region extraction can be carried out, besides by editing two-dimensional images, by using three-dimensional computer graphics (3D CG). An example of selecting and processing parallax regions in this case will be described below.

In 3D CG, although cameras, lights and subjects are all constructed in virtual space in a computer, basic left and right images for the stereoscopic vision are each produced by rendering with left and right cameras. Subsequently, aside from the basic left and right images for the stereoscopic vision, left and right masking images are generated. To produce the masking images, individual objects are set at white. Then, to render the left-eye masking image with the left-eye camera, they are irradiated from the right eye position, and to render the right-eye masking image with the right-eye camera, they are irradiated from the left eye position.

Through such rendering, in the image passing through the rendering with the left-eye camera, the regions visible from the right eye position become white and the regions invisible are darkened by shadow. Likewise, in the image passing through the rendering with the right-eye camera, the regions visible from the left eye position become white and the regions invisible are darkened by shadow. The dark portions are parallax regions.

Next, assuming that white portions of the images are set at zero percent of transparency, and black portions are set at 100 percent of transparency. Then the images are pasted to the basic left and right images for the stereoscopic vision as the masking images so that only the regions with the 100 percent transparency can undergo the image processing, thereby enabling the image processing with inconspicuous processing as will be described later. Thus constructing the three-dimensional model makes it possible to extract the left and right stereoscopic images and the target regions from a single model, and to carry out a series of calculations in a single calculation by constructing a plurality of complicated simultaneous equations.

In addition, as will be applicable to all the examples, as for the processing of the target regions which will be described later, the processing is carried out by comparing color information items at the positions of the corresponding points on the priority-assigned region side and on the removed region side. Accordingly, it is obvious that adjusting and processing on a vertex by vertex basis is more desirable than processing the target regions.

EXAMPLE 3

FIG. 5B is a view showing images obtained by transferring the left and right eye images that are described with reference to FIG. 3B. Referring to FIG. 5B, extraction of the target regions using the foregoing extraction method 2 and identification of the removed region will be described. In FIG. 5B, the front subject is seen sharp, and the back subjects of the front subject are seen blurredly. From one of the eyes, parts of the images are invisible because of the concealment by the front subject.

In the images as shown in FIG. 5B, the foci of the left and right eyepoints are adjusted on the point a on the subject A. Accordingly, the subject AL and point aL on the left image 370, and the subject AR and point aR on the right image 371 are sharp. As for the subject B, since it is at the back of the subject A, the subject BL is more blurred than the subject AL in the left image 370.

In the right image 371, the subject BR is more blurred than the subject AR, and the lower half of the subject BR is concealed by the subject AR. The hidden region is also present in the left image 370. Assume that the region is referred to as the region Y1, then the region Y1 is not present in the right image 371. Likewise, the subject corresponding to the subject D at the back of the subject B is the subject DR in the right image 371, and it is more blurred than the subject BR. In addition, in the left image 370, the subject AL conceals the lower half of the subject DL, and the hidden region is present in the right image 371. Assume that the region is referred to as a region Y2. Then, the region Y2 is not on the left image 370. In the right image 371, the subject DR is more blurred than the subject BR.

The hatched regions Y1 and Y2 are regions that are present only in one of the images (such as the point bL and point dR) without having the pair of the corresponding fused points in the left image 370 and right image 371 when the stereoscopic vision observer views in the stereoscopic vision the left image 370 and right image 371 as the binocular parallax stereoscopic images. In the regions Y1 and Y2, since the stereoscopic vision observer views different points with the left and right eyes, the binocular rivalry occurs.

For the reason as described above, the point aR and its periphery in the right image 371 corresponding to the region Y1 in the left image 370 are sharp and hence perceived first. Likewise, the right half of the subject AL in the left image 370 corresponding to the region Y2 in the right image 371 are sharp and hence perceived first.

Accordingly, the region Y1 in the left image 370 and the region Y2 in the right image 371 are regions to be removed when both the images 370 and 371 are viewed in the stereoscopic vision as the binocular parallax stereoscopic images. The regions are unseen regions in the present stereoscopic images.

EXAMPLE 4

Figure 5C:
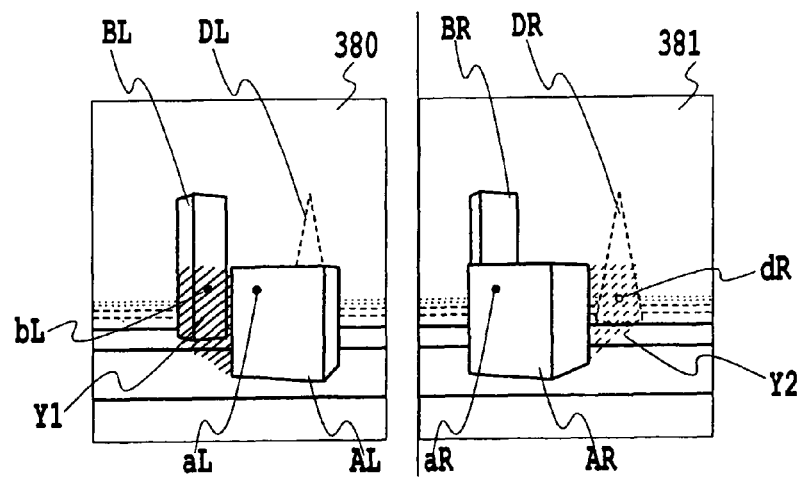
FIG. 5C is a view showing images obtained by transferring left and right eye images described with reference to FIGS. 3A and 3B, and FIGS. 4A and 4B.

FIG. 5C is a view when the focus is adjusted on both the subject A and subject B of an embodiment. Such a case can occur because the photographic image has a great depth of field, and the range in which the focus is achieved is wide as described above.

This case can be considered as a case where the focus is adjusted on the locations out of focus in FIGS. 5A and 5B and where the quantity (intensity) of out-of-focus of these locations is small. Accordingly, it is possible to consider either the point a as the priority-assigned point or the point b as the priority-assigned point.

In the present example, since the front object (subject A) is normally sharper and more conspicuous, the front object (subject A) is assumed to be a priority-assigned object. In this case, the region Y1 becomes a removed region, which follows the principle 1. Generally, a front image having the hidden and overlapped relationship is more conspicuous than a back image, and to make it inconspicuous, a certain amount of out-of-focus is required. In addition, as for the region Y2 visible only in the right image 381, since it differs from the region Y2 of FIG. 5B in that the out-of-focus of the lower half of the subject DR is smaller than that of FIG. 5B, the region Y2 is a removed region as in FIG. 5B.

As described above, the regions to be removed are extracted by comparing the left image regions and the right image regions in which the binocular rivalry occurs.

Thus, one of the features of the present invention is to extract the removed regions locally from the regions in which the binocular rivalry occurs. In other words, as for the processing regions which will be described later, it is not necessary to consider all the regions which are out-of-focus in the depth of field, but is enough to consider only locally.

Second Embodiment

The processing will be described of the removed regions undergoing the extraction, and the identification and extraction. Since the present invention is predicated on the left and right images in the stereoscopic vision generated by the photography or the like, the hatched regions Y1 and Y2 in the images as shown in FIG. 5B are rather sharp, and are often taken more conspicuously and clearly than seen directly in the real world. In view of this, as for the region Y1 in the left image 370 and the region Y2 in the right image 371, they are processed in such a manner that they are more dimly perceived by the stereoscopic vision observer. In addition, the region X1 in the right image 521 as shown in FIG. 5A is processed when its out-of-focus quantity is small and if it is flickering if any when viewed in the binocular stereoscopic vision. Generally, there is a tendency for the out-of-focus of the front subject in the binocular stereoscopic vision to become more conspicuous than the out-of-focus at the back, and for the binocular rivalry to become larger. The binocular rivalry can be mitigated by making the image regions to be removed more inconspicuous in the region in which the binocular rivalry occurs.

In this way, the left image which is taken from the left eye position and is completed with the single left eye, and the right image which is taken from the right eye position and is completed with the single right eye are subjected to the processing and amendment separately as the images for the binocular stereoscopic vision. When observing the individual images after the processing and amendment separately as an ordinary image, they become an image, part of which is blurred or fainted. Accordingly, the images which undergo extreme processing and amendment are not suitable to be used as a single image, and are accepted only for the binocular stereoscopic vision.

Furthermore, in FIG. 5B, for example, it is not impossible to gaze at the out-of-focus regions because the images for the binocular stereoscopic vision are images, which will be described here. For example, assume the case when gazing at the point bL of the left image 370. Since the point bL is present only in the left image 370, it is seen with the left eye. Searching the right image 371 for the point corresponding to that point with the right eye, it is found that the point aR is the corresponding position judging from the contents of the image. When gazing at the point bL with the left eye and the point aR with the right eye at the same time, the binocular rivalry increases. Since the right eye views the point aR clearly, and the left eye views the point bL blurredly, the observer gazes at the point aR (with the right eye) which is visible clearly, and searches for the point corresponding to that point with the other eye (left eye in this case). Moving the focus of the left eye on the point aL in the left image 370 and gazing at the point aR with the right eye enable image fusing. In addition, since the eye pain or the waver of the flickering image, which is perceived when the binocular rivalry increases is not perceived, the point aL in the left image 370 and the point aR in the right image 371 are selected as the corresponding point (fused point) of the two eyes.

When the human eyes observe the image, the gazing point moves frequently on the image. As in the binocular stereoscopic vision, when the left eye looks at the left image, and the right eye looks at the right image, the two eyes search for and identify the fused point, and operate to acquire the depth information. For example, as the point bL in FIG. 5A, there is a point that gives the correct depth position when observed with only one of the two eyes. Thus, in the images for the binocular stereoscopic vision, the observer cannot observe with changing the focal position freely as observing the outside world. Accordingly, these images can be said as an image that sets the contents to be perceived in advance. Considering the foregoing facts, the present invention can be said that it detects and amends the portions unsuitable for the contents set in advance, considering that the images for the stereoscopic vision are images such as photographs.

(Processing of Removed Regions)

According to the principle 1 or 2, in the regions in which the binocular rivalry occurs, the regions which are not given priority are extracted separately from the left image and right image. Then by processing the extracted regions, the left image and right image, which are generated based on each single eye of the left and right eyes and have the parallax, are subjected to the processing and amendment for generating the left image and right image for the binocular stereoscopic vision.

When observing the different visual images with the left eye and right eye, if one of the images is visible more clearly than the other visual image, the visual image of the eye that views more clearly is given priority, and the visual image of the other eye is ignored. However, when they are visible at substantially the same degree with the two eyes, the binocular rivalry becomes conspicuous. In this case, the left and right visual images are mixed, and the confused visual images are perceived, which usually causes flickering and pain of the eyes.

Thus, a method of processing and amendment of such removed regions will be described. It is easy if it is sufficient for the removed regions to be eliminated. However, only eliminating parts of the images can make them more conspicuous, and filling them with black can only make them more conspicuous.

Thus, since the regions to be removed (regions to be processed) in the binocular rivalry are unseen regions in the binocular stereoscopic vision, it is found that the region should be subjected to the processing and amendment that make them inconspicuous to bring them into an inconspicuous state (the inconspicuous state means that the images are inconspicuous and it is difficult to adjust the focus on them because of the out-of-focus, the running, the state difficult to look at because of low contrast, and sober tones (the low saturation).

As a concrete processing method, considering that the images are composed of pixels, there is a processing of rearranging the pixels, which are arranged in a certain rule, to make them more inconspicuous. When looking at the three-dimensional world with the human eyes directly, since the focus is not adjusted on the regions to be removed by the binocular rivalry, the regions become more blurred and inconspicuous.

The human eyes cannot edit the retinal image. As for the images, however, they can be subjected to a variety of processings through the image processing. Thus, there are a wide variety of methods other than only increasing the out-of-focus quantity. More specifically, the following processings (image processings) can make the removed regions inconspicuous. In addition, a desired combination of the processing methods can produce the optimum processing for the characteristics of the individual images.

(1) Blurring Removed Regions.

Blurred images are more inconspicuous than sharp and clear images (as the blurring processing, a variety of methods known in the present technical field can be used). In the method of blurring, the out-of-focus at the back does not erode the sharp front objects as shown in FIGS. 1A and 1B. The out-of-focus on this side blurs the back sharp subjects in a manner of eroding. The processings of the following (2) onward which will be described below can be carried out with eroding boundaries or without eroding them in the same conditions as the blurring processing.

(2) Lowering Contrast in Removed Regions.

For example, regardless of whether out of focus or not, a plane with high contrast is thought to be more conspicuous than a plane colored with a single color. The images are composed of pixels, and the pixels have information about the hue, saturation and brightness (three factors of color) Lowering contrast means averaging of the pixels in the removed regions, and to lower the contrast is to bring one of the hue, saturation and brightness (three factors of color) close to the values the peripheral pixels have. Bringing only the pixels, which have much greater information than the average in the region, close to the average can make the region inconspicuous.

(3) Lowering Saturation and Brightness (Luminance) in Removed Regions.

(4) Bring Hue Close to Cold Color Family (Generally, Cold Color Family Becomes More Somber Color).

(5) Bring Hue, Saturation and Brightness (Three Factors of Color) in Removed Regions Close to Values in Regions Corresponding to Removed Regions in the Other Image (Regions Given Priority in Binocular Rivalry).

The hue, saturation and brightness (three factors of color) are brought close to the values in the regions that are given priority in the binocular rivalry to make inconspicuous.

In the present embodiment, the left image and right image can be processed in advance. They are processed before displayed on a display. (Although the effect of the present invention is achieved without the processing in advance), the processing beforehand offers the following advantages.

When processing the left-eye image taken from the eyepoint of the left eye and the right-eye image taken from the eyepoint of the right eye to the left-eye image and right-eye image for the binocular vision, and when printing them on paper or the like, the original images are subjected to the processing and amendment to produce amendment images and to use them. As for the images fixed on paper and the like, they cannot be processed at all unless they are processed beforehand.

To display the images on the display, the images undergo the processing before the display, and the images passing through the processing are displayed. To display on an ordinary display, the original data are processed in advance, and the data passing through the processing are displayed (it is apparent that the following usages when displaying on the display fall within the scope of the present invention: Reading the original data and displaying them on the display via a processing means; observing photographs taken with a video camera in real time; and watching past stereoscopic videos).

To display on a computer, like displaying on the display, an image processing program operating on the computer carries out the processing and amendment of the original images and outputs the resultant data to the display. Although it is possible to carry out the processing after the binocular images have been generated once, the processing after detecting the removed regions in the process of calculating the videos three-dimensionally can complete the calculations in a single time calculation.

As described above, the processing of the left image and right image beforehand enables simplification of the apparatus and inexpensive easy processing. In addition, a lot of persons can watch at the same time.

Furthermore, the existing technique mentioned above is a method that does not carry out the processing in advance, and the method of carrying out the processing is only a blurring method. Besides, as for the similar existing technique, the method of carrying out the processing is also a blurring method. In contrast, the present invention relates to the processing method of the removed regions, and proposes a processing method based on the image processing other than the blurring. The foregoing existing techniques or the similar existing techniques do not include the processing method except for detecting the gazing point of the image observer, and blurring by identifying and extracting the removed regions in the regions in which the binocular rivalry occurs.

Accordingly, the processing methods (2)-(5) other than blurring, which are described in the processing of the removed regions, are methods not conceived before.
(Image Processing System Configuration)

So far, an example of the deformation processing is described. The following are the description of a system configuration for implementing the image processing.

Figure 21:
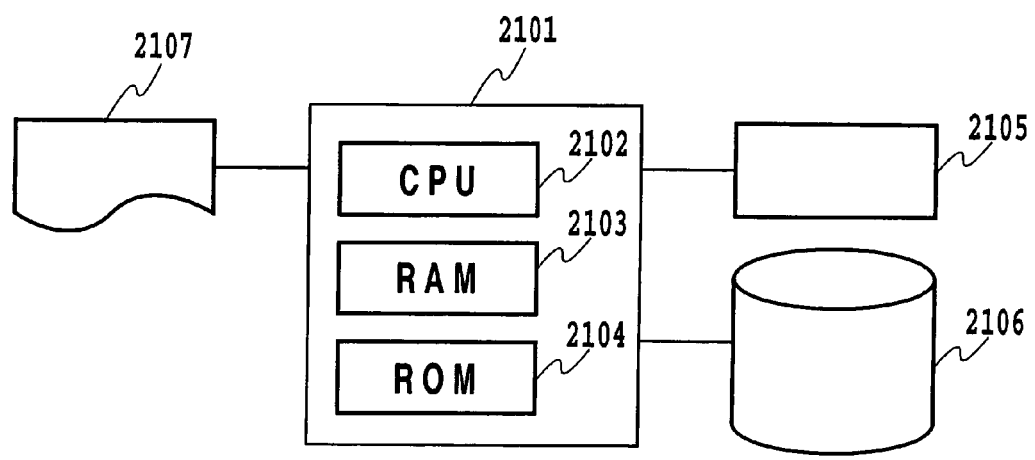
FIG. 21 is a schematic diagram showing an embodiment of an image generating system which is an image generating apparatus in accordance with the present invention.

FIG. 21 is a schematic diagram showing an embodiment of an image generating system which is an image generating apparatus in accordance with the present invention. Although the system of the present embodiment includes a main unit 2101, an image input section 2105, an image output unit 2107 and an external storage 2106, it is not limited to the configuration. The main unit 2101 includes a CPU 2102, a RAM 2103 and a ROM 2104.

The image input section 2105 reads original images which are stereoscopic images generated in advance. The main unit 2101 carries out the foregoing image processing, and the image output unit 2107 outputs the images passing through the image processing. As for the image input section 2105, when the original images are recorded in photographs, it can be a scanner. However, when the original images are provided in a particular data file, it can be a variety of input interface units. In addition, the image output unit 2107 can be a printer for printing the images on paper and outputting it. Alternatively, it can be a display or screen for displaying the images directly.

In the present embodiment, it is the main unit 2101 that detects the regions in which the binocular rivalry occurs and the removed regions, and carries out the image processing of the removed regions. These operations are usually executed by image processing software. Setting values required by the programs of the image processing software and executing the image processing cause the CPU 2102 to read out the programs stored in the external storage 2106 via an operating system stored in the ROM 2104 and the like, and to load the programs into the RAM 2103. The programs loaded into the RAM 2103 executes their steps sequentially to process the input images according to the values designated, thereby outputting the resultant images.

In the image processing/amendment and deformation in the present embodiment, the image processing of two-dimensional images is carried out using a computer such as the main unit 2101. Using the image processing function of the image processing software for two-dimensional images (such as Adobe Photoshop (trade mark)) enables the image processing of the removed regions (for example, see "Information processing of images and space", Iwanami Lectures, Multimedia Information Science)

A flowchart of the processing is shown in FIG. 6.

Incidentally, in the case of the stereoscopic vision using a stereoscopic apparatus, it is possible to carry out the stereoscopic vision using the stereoscopic images passing through the processing mentioned before as the stereoscopic images, just as the case of observing the stereoscopic images with an imaginary inclined angle, which will be described later.

Applying the method of improving the stereoscopic effect to the method of mitigating the binocular rivalry described above can increase a stereoscopic effect of the existing stereoscopic images, and can reduce fatigue.

Third Embodiment

Although the stereoscopic images are subjected to the processing in advance in the foregoing second embodiment, it is also possible to detect the gazing point of the observer looking at the stereoscopic images, and to add blurring. The present embodiment proposes a method or an apparatus that always enables adding the blurring from the gazing point by updating the gazing point every time the gazing point moves. More specifically, it is possible to newly add the depth of field of the observer of the stereoscopic images by detecting the gazing point of the observer looking at the stereoscopic images displayed on the display, by making a decision of a depth distance of the gazing point in the original three-dimensional space, and by gradually blurring in the forward and backward directions from the gazing point in the three-dimensional space. Instead of adding the blurring, it is also possible to apply at least one of the processing methods for making inconspicuous described in the processing method of the removed regions, thereby being able to add the effect of the pseudo depth of field.

Fourth Embodiment

Considering the object of the present invention, only for watching the stereoscopic images with the stereoscopic vision, it is not always necessary to form stereoscopic images at strict precise positions because it is enough to perceive images with a three-dimensional effect. In this case, the vergence angle at the image formation point, which is obtained when the stereoscopic vision observer watches the left image with the left eye and the right image with the right eye at the same time, is not recognized in terms of an absolute value (measured value) as in the photographic survey, but is recognized in terms of a relative amount of changes (relative value) indicating that among two or more image formation points compared, the image formation point with a wider vergence angle is located on this side, and the image formation point with a narrower vergence angle is located at a deeper position.

Thus, the stereoscopic vision for watching is effective when the magnitude of the vergence angle is proportional to the front-to-back depth position, and when the distortion of shapes is not specially perceived. Increasing the vergence angle at the image formation point on this side by a small amount causes the image formation point to standing out, and hence increases the depth feeling of the entire stereoscopic image, thereby heightening the three-dimensional effect and hence resulting in a more impressive stereoscopic images. This principle will be described in more detail below.

First, there are two aspects of how the vergence angle the observer observes is determined when the observer looks at the left and right images for the stereoscopic vision. The first aspect is about the vergence angle at taking the photographs and the vergence angle at the observation. The second aspect is about the space between the left and right images at the observation.

(Vergence Angle at Photographing and Vergence Angle at Observation)

The first aspect is about the vergence angles at taking photographs and the vergence angles at observation. More precisely, the vergence angles at the points (positions) on the individual three-dimensional subjects acquired into videos when taking photographs (from now on, these vergence angles are defined as at-production video vergence angles, and the space in which these angles are distributed is referred to as an at-production video vergence angle space), and the vergence angles the stereoscopic vision observer perceives who carries out the stereoscopic vision of the videos acquired by taking the photographs (from now on, these vergence angles are defined as at-observation video vergence angles, and the space in which these angles are distributed is referred to as an at-observation video vergence angle space). These vergence angles are called video vergence angles because they are vergence angles transferred into the left and right videos for the stereoscopic vision. In addition, the at-observation video vergence angle is defined as the vergence angle obtained when the space between the corresponding far points in the left and right images is equal to the space between the two eyes.

When the state at the production and the state at the observation have identical or similar figures, the same vergence angle is perceived at the observation as at the production (for example, see Hiroshi Inoue, "Explore the mysteries of stereoscopic vision" (The Optronics Co., Ltd., Published February, 1999)). However, it is very difficult to observe the left and right images in the same state as the state in which the left and right stereoscopic photographs are taken. In many cases, similar figures are not achieved because the relationships between the photographic base length at production and the distance to the subject differ from the relationships between the eye base length at the observation and the distance to the photographs.

However, because the eye base length is shorter than the photographic base length, a phenomenon that a subject seems to be higher than its actual height occurs in the aerial photography of the stereoscopic vision in particular. The phenomenon is called vertical exaggeration (for example, see, Japan Society of Photogrammetry and Remote Sensing, "Method of viewing, taking and creating stereoscopic photograph" (Gihodo Shuppan Co., Ltd.). Thus, it can generally occur in the stereoscopic vision that the relationships between the base length and the distance to the subject vary at the observation and at the production.

Generally, the at-production video vergence angle and the at-observation video vergence angle have a certain functional relationship. However, since this is not important in the present invention, the description of the interrelationship will be omitted here.

Figure 7:
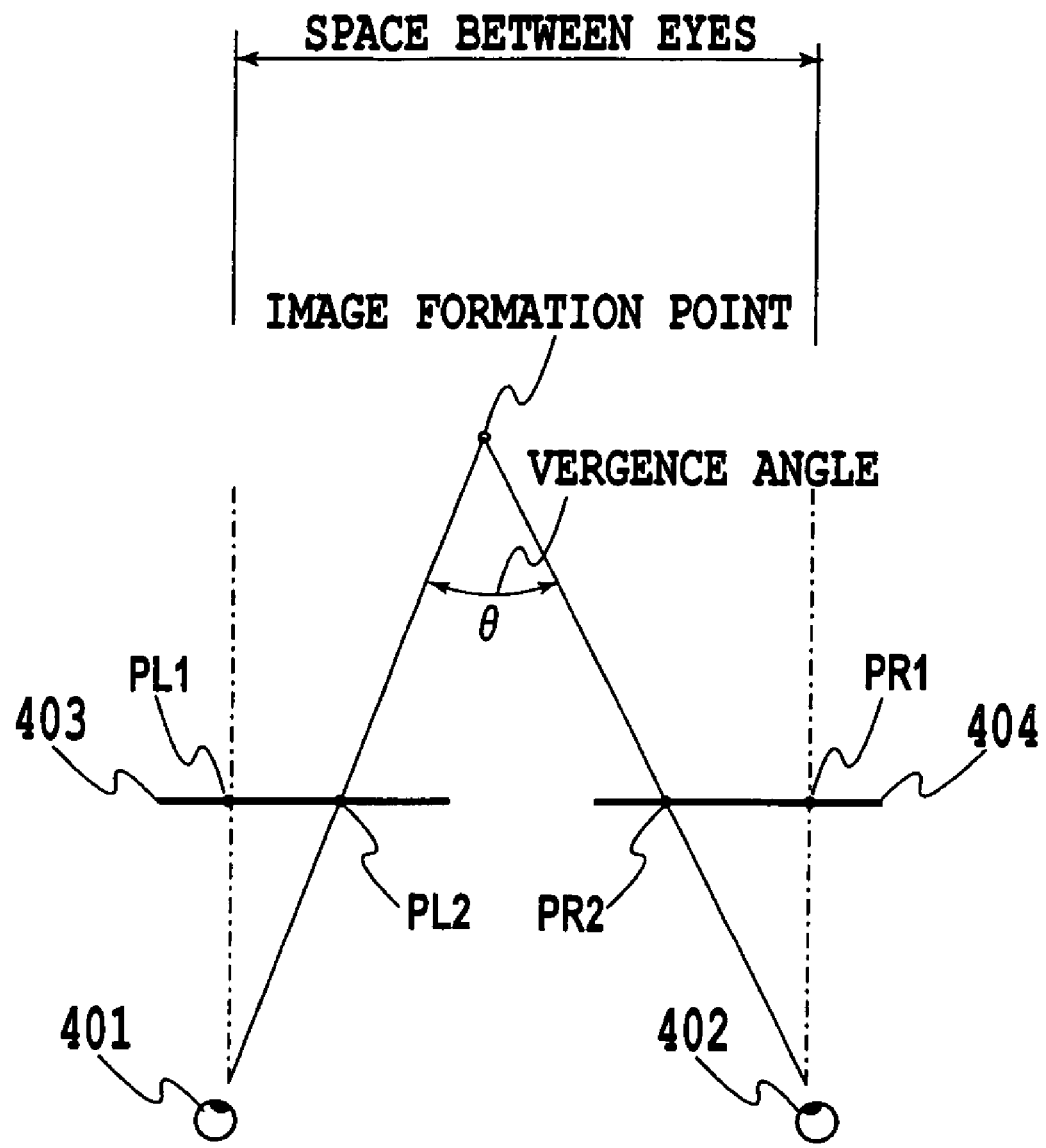
FIG. 7 is a view illustrating a video vergence angle at observation in an embodiment in accordance with the present invention.

What matters in the present invention is the at-observation video vergence angle and the base vergence angle which will be described later. FIG. 7 is a diagram illustrating the at-observation video vergence angle of an embodiment in accordance with the present invention. The at-observation video vergence angle is determined by setting the distance from the eyepoints to the stereoscopic left and right images and the scale of the stereoscopic left and right images because the stereoscopic left and right images are placed with separating the far points of the image contents by the distance between the two eyes.

Here, assume in the three-dimensional world that a gazing point of the observer close to the observer is referred to as a near point, and that the gazing point of the observer faraway from the observer and out of the influence of the vergence angle is referred to as a far point. Then the far point on the left image 403 is PL1, and the far point on the right image 404 is PR1, the near point on the left image 403 is PL2, and the near point on the right image 404 is PR2. The left and right images are disposed in such a manner that the distance between the far point PL1 on the left image 403 and the far point PR1 on the right image 404 becomes equal to the distance between the two eyes.

The extension line of the line connecting the left eye 401 to the near point PL2 on the left image intersects with the extension line of the line connecting the right eye 402 to the near point PR2 on the right image 404, forming the vergence angle θ. The vergence angle θ is the at-observation video vergence angle.

(About Base Vergence Angle)

As the second aspect, the space at which the left and right images (bases) are placed at the observation will be described. Generally, the left and right images for the stereoscopic vision are placed separately on the left and right in such a manner that the distance between the corresponding far points in the left and right images becomes equal to the distance between the two eyes. However, to emphasize the standing out effect and withdrawal effect of the stereoscopic images, separating or bringing near the left and right images by changing the space between them is a well practiced method of operating the image formation position of the stereoscopic images.

Assume that the vergence angle resulting from the space at which the left and right images for the stereoscopic vision are placed is defined as a base vergence angle, and that the space in which the base vergence angle is distributed is defined as a base vergence angle space. Since the distribution of the base vergence angle forms a plane, an imaginary plane formed by it is defined as an imaginary plane. In particular, a plane inclined with respect to the display plane on which the left and right images for the stereoscopic vision are placed is defined as an imaginary inclined plane. The imaginary inclined plane is not always a continuous plane, but includes all the planes except for the planes that are level with or parallel with the image plane.

Figure 8:
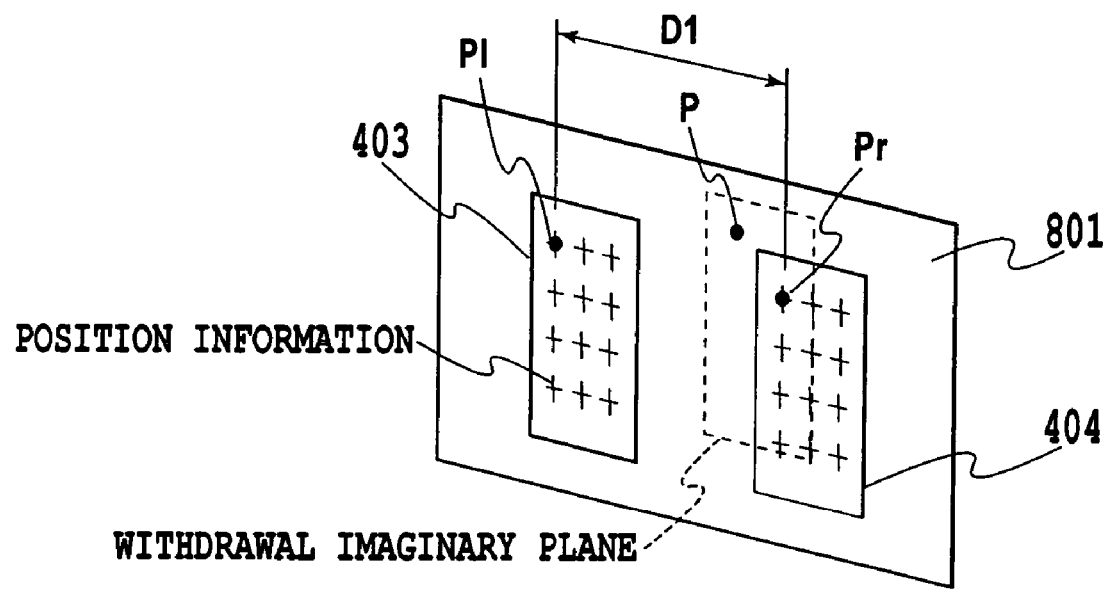
FIG. 8 is a view illustrating that an imaginary plane moves backward by varying the space between the left and right images of an embodiment.
Figure 9:
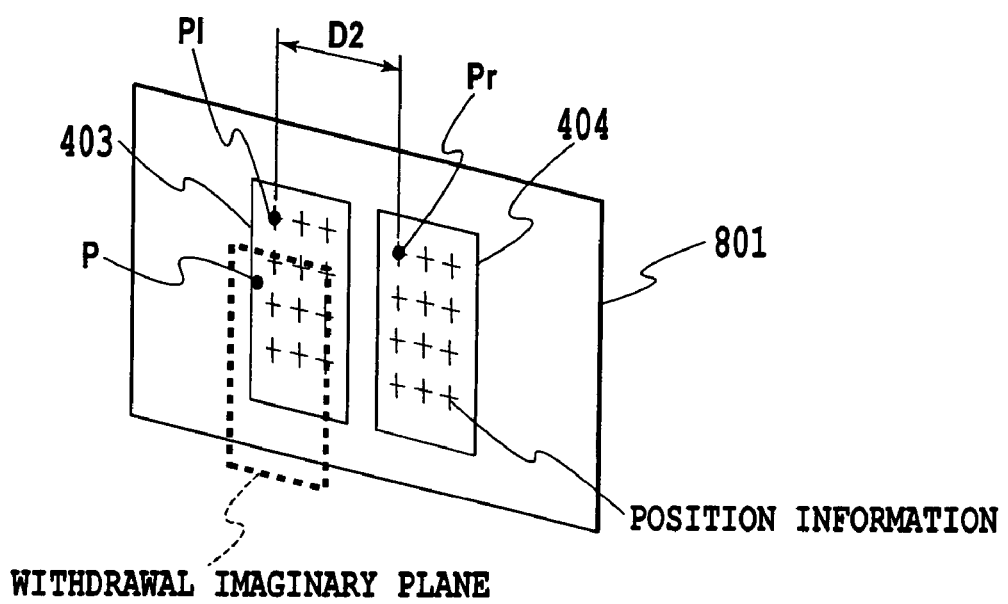
FIG. 9 is a view illustrating that an imaginary plane moves forward by varying the space between the left and right images of an embodiment.

The base vergence angle will be described with reference to FIGS. 8 and 9. FIG. 8 is a view illustrating backward movement of the imaginary plane by changing the space between the left and right images of an embodiment. FIG. 9 is a view illustrating forward movement of the imaginary plane by changing the space between the left and right images of the embodiment. Here, the stereoscopic left and right images 403 and 404 are both planes displayed on a display plane 801. Separating or bringing near the left and right images 403 and 404 by changing the space between them causes the standing out effect and withdrawal effect of the plane when the observer carries out the stereoscopic vision. The effects are brought about by only the positional relationship of the image bases independently of the at-observation video vergence angle.

In FIGS. 8 and 9, crisscrosses drawn on the left and right images 403 and 404 indicate points giving position information, and are distributed uniformly in the individual images (so-called XY coordinates on the images). The corresponding points Pl and Pr on the left and right images 403 and 404 are fused and determine the image formation point.

In FIG. 8, since the left image 403 and right image 404 are separated, the imaginary plane is withdrawn. In FIG. 9, since the left image 403 is close to the right image 404, the imaginary plane stands out.

Figure 10:
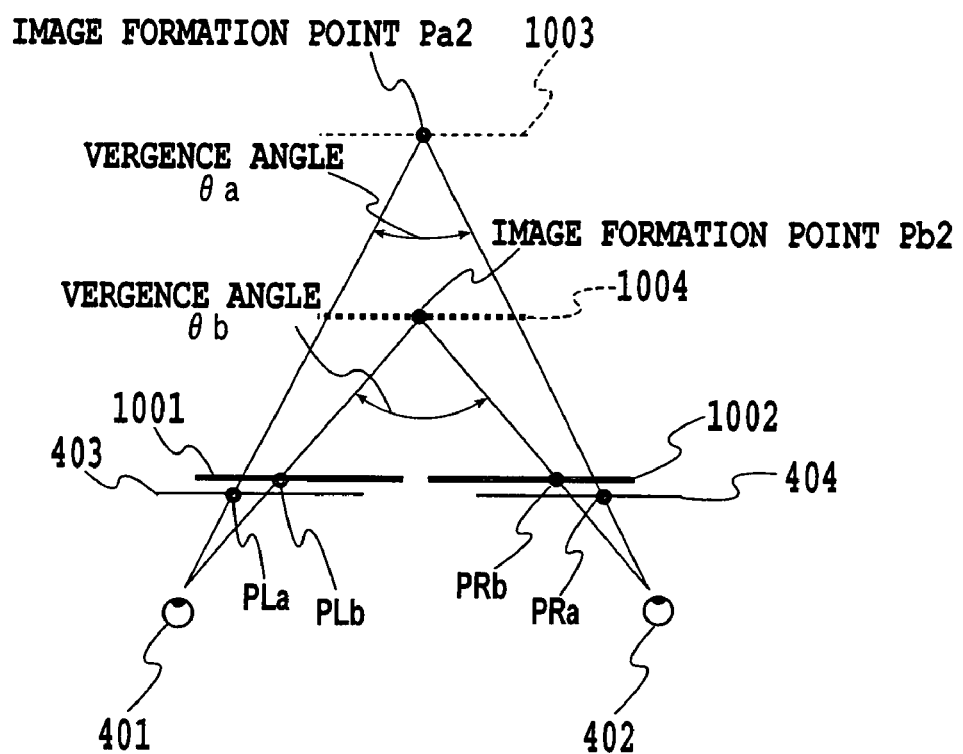
FIG. 10 is a view illustrating that an imaginary plane moves by varying the space between the left and right images of an embodiment.

These figures, however, are used to illustrate only schematically, and the image formation position of the vergence angle is not drawn correctly. Thus, the vergence angle will be described with reference to FIG. 10. In FIG. 10, PLa is a point on the left image 403, PRa is a point on the right image 404, PLb is a point on the left image 1001 after movement, and PRb is a point on the right image 1002 after movement. The point PLa on the left image 403 and the point PRa on the right image 404 are placed with a space narrower than the space between the two eyes. Here, the points PLa and PRa and the points PLb and PRb are position information (points) on the corresponding images, respectively.

The extension line of the line connecting the left eye 401 to the point PLa and the extension line of the line connecting the right eye 402 to the point PRa intersect with each other, and form an image at the intersection point Pa2. The vergence angle between the two lines of vision is $\theta a$. The imaginary plane 1003 according to the left image 403 and right image 404 is formed at this position. Next, the left image 403 and right image 404 are moved in such a manner that the distance between them is reduced. Thus, the left image 403 and the point PLa on the plane are moved to the positions of the left image 1001 and point PLb, and the right image 404 and the point PRa on the plane are moved to the positions of the right image 1002 and point PRb, respectively. Here, $\theta$ is the at-observation video vergence angle, and $\theta c$ is a total vergence angle.

The extension line of the line connecting the left eye 401 to the point PLb and the extension line of the line connecting the right eye 402 to the point PRb intersect with each other, and form an image at the intersection point Pb2. The vergence angle between the two lines of vision is $\theta b$. The imaginary plane 1004 according to the left image 1001 and right image 1002 is formed at this position.

Since $\theta b > \theta a$, the imaginary plane 1004 appears on this side of the observer as compared with the imaginary plane 1003. This is the principle of causing the standing out effect when the left and right images for the stereoscopic vision are brought closer to each other, and is the principle of the base vergence angle.

As described above, as the phenomena resulting from the magnitude of the base vergence angle, it is possible to understand the interrelationship between the standing out effect and withdrawal effect of the stereoscopic image in its entirety, and the magnitude of the space between the left and right images for the stereoscopic vision.

(Relationship between At-Observation Video Vergence Angle and Base Vergence Angle)

The relationship between the at-observation video vergence angle and the base vergence angle will be described. The at-observation video vergence angle is a vergence angle that is formed by individual points on the images and the two eyes of the observer as a result of placing the stereoscopic left and right images with separating them by the distance between the two eyes of the stereoscopic vision observer as described above. Since the points at which the base vergence angle is formed are distributed on the individual images uniformly, it is possible to establish the reference point of the base vergence angle at the position overlapped on the far point in the at-observation video vergence angle.

Since the left and right images are separated by the distance between the two eyes, the base vergence angle is parallel, that is, zero. Assuming that the total vergence angle is defined as the vergence angle the stereoscopic image observer perceives, the following expression holds.

total vergence angle=at-observation video vergence angle

Referring to FIG. 7, when the left and right images are placed in such a manner that the distance between the far point PL1 on the left image 403 and the far point PR1 on the right image 404 is equal to the distance between the two eyes, the extension line of the line connecting the left eye 401 to the near point PL2 on the left image 403 and the extension line of the line connecting the right eye 402 to the near point PR2 on the right image 404 intersect with each other and form the vergence angle $\theta$. The vergence angle $\theta$ is the at-observation video vergence angle.

Figure 11:
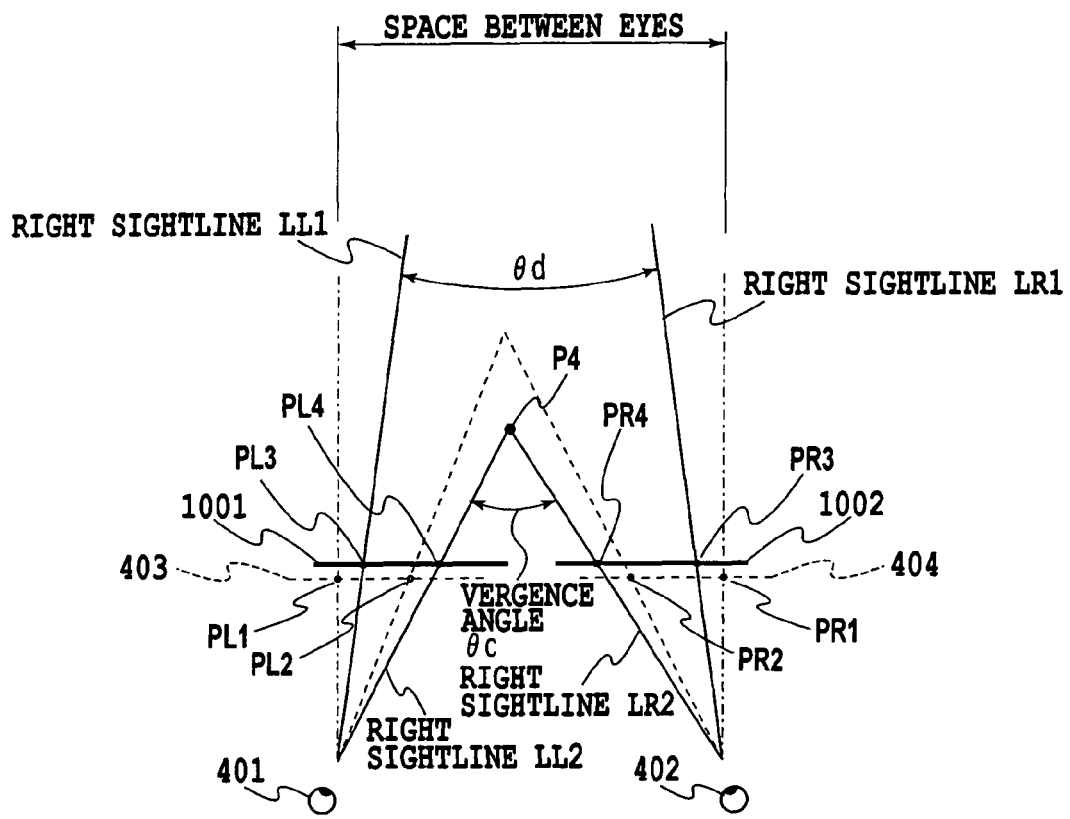
FIG. 11 is a view illustrating that an imaginary plane moves by reducing the space between the left and right images of an embodiment.

Subsequently, the left and right images are brought closer to each other without changing the distance from the eyepoint to the images or the scale of the images. Referring to FIG. 11, when the left image 403 is moved to the position of the left image 1001 toward the right image 404, the far point PL1 and near point PL2 on the left image 403 move to the far point PL3 and near point PL4 on the left image 1001. Likewise, when the right image 404 is moved to the position of the right image 1002 toward the left image 403, the far point PR1 and near point PR2 on the right image 404 move to the far point PR3 and near point PR4 on the right image 1002.

The extension line LL2 of the line connecting the left eye 401 to the point PL4 and the extension line LR2 of the line connecting the right eye 402 to the point PR4 intersect with each other at the intersection point P4 which is the image formation point of the point PL4 and point PR4. Accordingly, the vergence angle of the two lines of vision (LL2 and LR2) is $\theta c$. The two eyepoints are the same, but the distance between the points PL4 and PR4 is reduced from the original distance. Thus, the following expression holds.

$\theta c > \theta$

Likewise, the extension line LL1 of the line connecting the left eye 401 to the far point PL3 and the extension line LR1 of the line connecting the right eye 402 to the point PR3 intersect with each other at the intersection point P3 which is the image formation point of the point PL3 and point PR3. Accordingly, the vergence angle of the two lines of vision (LL1 and LR1) is $\theta d$. The two eyepoints are the same, but the distance between the points PL3 and PR3 is reduced from the original distance. Thus, the following expression holds.

$\theta d > \theta$ where $\theta d$ is the base vergence angle.

Consequently, assuming that the total vergence angle is defined as the vergence angle the stereoscopic image observer perceives, the following expression holds.

total vergence angle=base vergence angle+at-observation video vergence angle

The expression, however, is a conceptual expression, which does not mean the simple addition of the two vergence angles, but means that the total vergence angle is obtained by synthesizing the base vergence angle and the at-observation vergence angle.

As described above, the vergence angle (total vergence angle) the stereoscopic image observer perceives can be changed by varying the base vergence angle.

Figure 12:
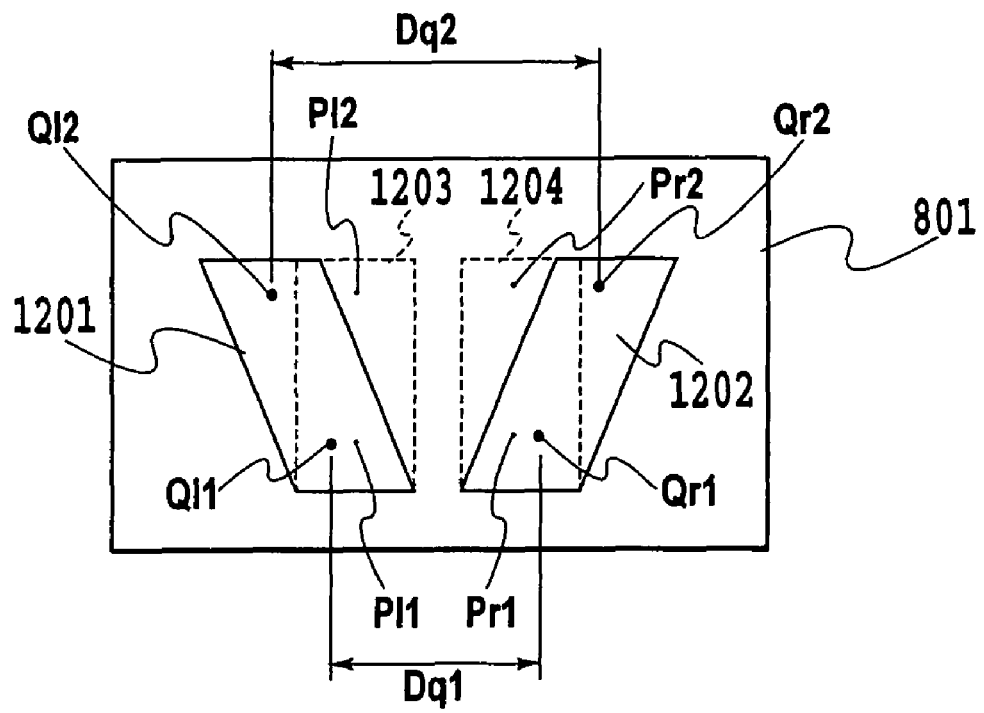
FIG. 12 is a view illustrating an image that undergoes deformation processing of the left and right images in such manner that an imaginary inclined plane is formed.

Next, referring to the drawings, the embodiments of the present invention will be described. FIG. 12 is a diagram showing images subjected to such deformation processing of the left and right images as to form the imaginary inclined plane. When the stereoscopic left and right images displayed on the display plane are deformed in such a manner that the vergence angle is reduced from the bottom to the top at a fixed rate, the base vergence angle space changes, and the imaginary plane is inclined, thereby providing the imaginary inclined plane whose top seems to be withdrawn to the back. In contrast, when the deformation is made in such a manner as to increase the vergence angle, the imaginary inclined plane is obtained whose top portion seems to stand out to this side. Varying the vergence angle from the top to the bottom, the slope of the imaginary plane is reversed vertically. The sloped plane is called the imaginary inclined plane. Although the imaginary inclined plane as shown in FIG. 12 is an example subjected to the deformation in which the top portion is withdrawn to the back, this is not only the case. For example, the imaginary inclined plane can be any planes including curved planes except for the same plane as the display plane.

In FIG. 12, a point Pl1 and a point Pl2 are drawn on a single line in the lower portion and the upper portion of the original left image 1203, respectively. Likewise, a point Pr1 and a point Pr2 are drawn on a single line in the lower portion and the upper portion of the original right image 1204, respectively. They are juxtaposed left and right on the display plane (the distance between the point Pl1 and point Pr1=the distance between the point Pl2 and point Pr2).

Now, the upper portions of the original left and right images 1203 and 1204 are subjected to the deformation in the opposite directions. From now on, the stereoscopic left and right images after the deformation are referred to as a deformed left image and a deformed right image, respectively. The point Pl1 and point Pl2 on the original left image 1203 are moved in the direction opposite to the screen center to the positions of the point Ql1 and point Ql2 on the deformed left image 1201. Likewise, the point Pr1 in the lower portion and the point Pr2 in the upper portion on the original right image 1204 move in the direction opposite to the screen center to the positions of the point Qr1 and point Qr2 on the deformed right image 1202.

The distance Dq1 between the point Ql1 and point Qr1 is shorter than the distance Dq2 between the point Ql2 and point Qr2. In other words, the following expression holds.

Dq2>Dq1

EXAMPLE 1

Figure 13:
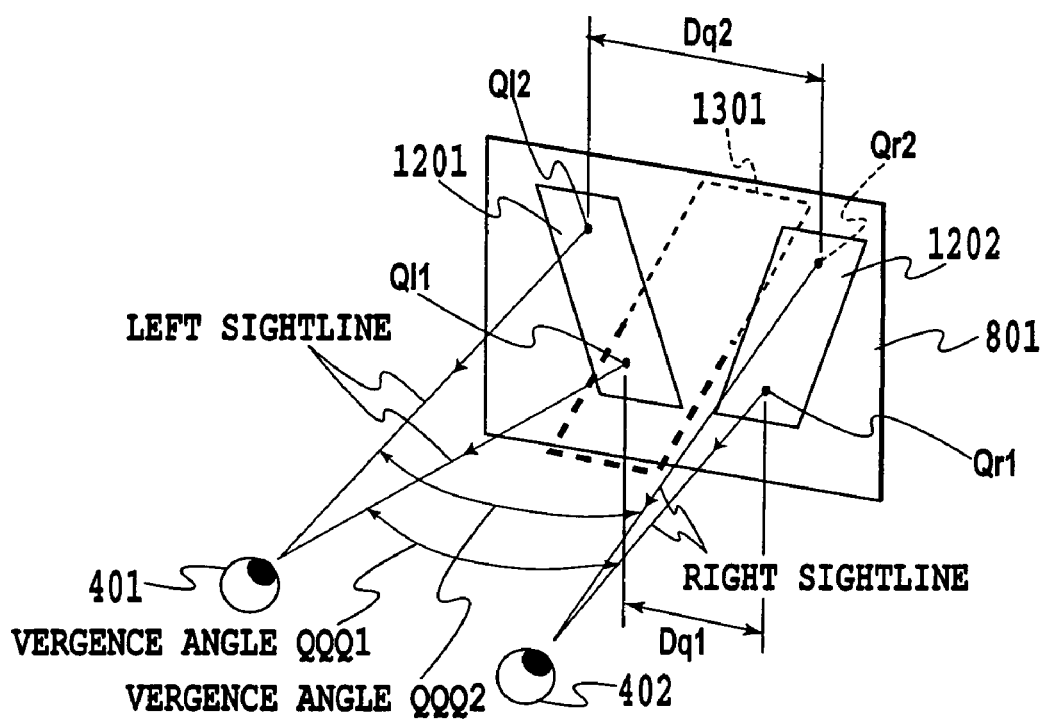
FIG. 13 is a view illustrating an image that undergoes deformation processing of the left and right images in such a manner that an imaginary inclined plane is formed.

FIG. 13 is a view showing the imaginary inclined plane of an embodiment schematically. Fusing the point Ql1 and point Qr1 on the deformed left and right images 1201 and 1202 with the two eyes 401 and 402 provides the vergence angle QQQ1 to the eyes of the observer, and fusing the point Ql2 and point Qr2 provides the vergence angle QQQ2. Since Dq2>Dq1 the relationship between the vergence angles are as follows.

QQQ2<QQQ1

Thus, the vergence angle increases in the upper portions of the deformed left and right images, but reduces in the lower portion. Accordingly, as for the imaginary planes formed by the vergence angle of the observer, the lower portion stands out toward the observer side, and the upper portion withdraws. Thus as shown in FIG. 13, the imaginary inclined plane 1301 is formed which seems like an uphill from the position of the observer. In this way, only applying deformation to the original left and right images can generate the imaginary inclined plane in the stereoscopic images perceived in the stereoscopic vision. Applying the principle enables the generation of the imaginary inclined plane in accordance with the video contents by some contrivance of the deformation processing.

Consequently, although the vergence angle is provided which differs from the vergence angle of the original image, the foregoing processing can increase the amount of change of the vergence angle of the observer as compared with the normal case, and increase the perspective in the virtual space. As a result, it offers an advantage of being able to increase the absorbed feeling and improve the three-dimensional effect. In addition, even if the fused point is shifted because of such deformation of the left and right screens, as long as it is within the allowance of the fusing, the function intrinsic to the human eyes enables the stereoscopic vision by properly extracting the fused point of the left and right eyes from the left and right images. The imaginary inclined plane 1301, which is obtained by reducing the vergence angle from the lower portion to the upper portion at a fixed rate in the images as shown in FIG. 13, is particularly effective in such an actual image as there are plants on this side, houses and trees at the back, and forests and a river flowing which are at the further back and extending to faraway mountains. In other words, a good three-dimensional effect is obtained because the nearby plants and houses are brought still closer, and the far-off mountains are seen much faraway.

Furthermore, even when the depth is seen to be shallow as in a backdrop in ordinary stereoscopic images, the present invention can produce a rich three-dimensional effect with a great depth by the deformation processing.

Figure 20:
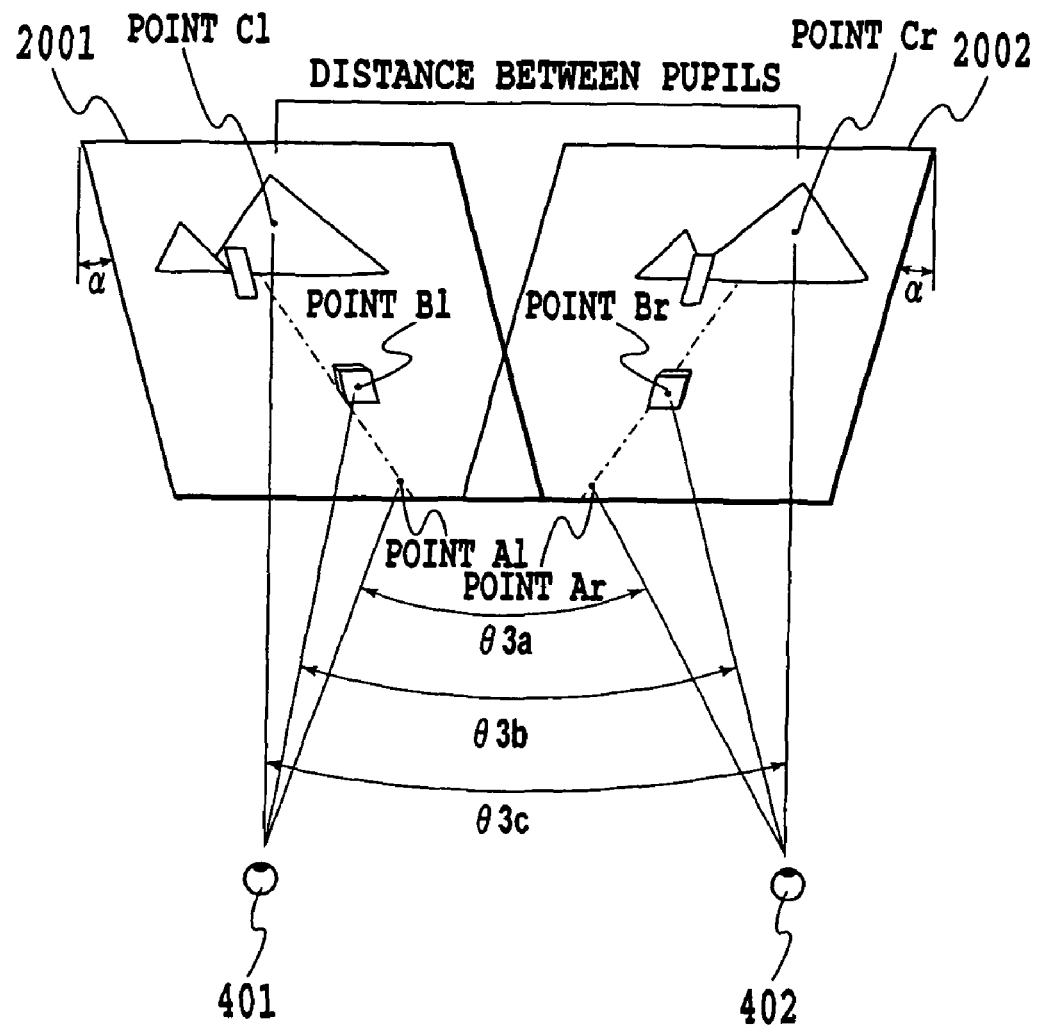
FIG. 20 is a view illustrating an image that undergoes deformation processing of the left and right images in such a manner that an imaginary inclined plane is formed.

Moreover, referring to FIG. 20, when the video contents of the stereoscopic images are an uphill, for example, the deformation processing carried out in such a direction as to separate the upper portions of the original left and right images 1203 and 1204 as in FIG. 13 produces the imaginary inclined plane of the uphill, which causes the upper portion of the imaginary plane to withdraw in the depth direction of the observer. (When the deformed left and right images are brought closer to each other, the imaginary inclined plane stands out in its entirety). Varying the deformation values halfway between the left and right images makes it possible to form an imaginary inclined plane with various slopes. As a result, the video vergence angle (the at-observation video vergence angle) the left and right images originally have on the imaginary inclined plane is distributed so that the total vergence angle space can be formed which is similar to the space of the video contents or which has an exaggerated depth.

Next, the present method is compared and weighed with the existing method of improving the effect of the stereoscopic vision. First, the values of changes of the vergence angles involved in the deformation of the left and right images will be described specifically. When the photographic base length is made longer, the vergence angle increases, and the parallax grows larger. Here, the left and right images 403 and 404 are deformed in accordance with the present invention, and the changes in the vergence angle will be described specifically.

Referring to FIG. 20, the left image 403 and the right image 404 created with the photographic base length Da are distorted. The left image 403 is distorted toward the optical axis by an angle α using the point Cl as the reference point, and the right image 404 is distorted toward the optical axis by an angle α using the point Cr as the reference point. In the more strict case, the upper portions of the point Cl and point Cr are not distorted. The left image 403 and the right image 404 are distorted and deformed to the deformed left image 2001 and deformed right image 2002.

The deformed left image 2001 and the deformed right image 2002 are placed in such a manner that the distance between the point Cl on the deformed left image 2001 and the point Cr on the deformed right image 2002 becomes equal to the pupil distance. The space between the point Bl and point Br becomes shorter than before the deformation. Likewise, as for the space between the point Al and point Ar, since they are remote from the point Cl and point Cr, it is reduced from the space between the point Al and point Ar before the deformation, and narrows more than the space between the point Bl and point Br after the deformation narrows.

Observing the deformed left image 2001 and deformed right image 2002 as the stereoscopic left and right images, it is found that although the vergence angle θ3c of the points C is zero, the vergence angle θ3a of the points A and the vergence angle θ3b of the points B increase toward the bottom of the images. The vergence angle θ3a is widest, and the vergence angle θ3b is next. As a result, the width distribution of the vergence angles becomes very similar to those of the left image 501 and right image 502 produced with the photographic base length Db (Db>Da).

In this way, it is possible to make the vergence angles wider as they are closer to the observer without increasing the parallax of the left and right images, thereby being able to increase the three-dimensional effect perceived by the stereoscopic vision observer.

In this case, if the stereoscopic left and right images have a sensory depth cue just as the photographic images, it can make inconspicuous the contradiction caused by the present invention which will be described later.

(Stereoscopic Apparatus)

The stereoscopic images generated in the present embodiment are applicable to any apparatuses as long as they are stereoscopic apparatuses for observing the stereoscopic images having the parallax in the left and right images. The stereoscopic images are applicable not only to the apparatus using two images, but also to a stereoscopic apparatus using a lot of pairs of the stereoscopic images, which is called a multi-view system. For example, an eight-image system can also be used which combines four pairs of images with shifting the eyepoint little by little.

Figure 22:
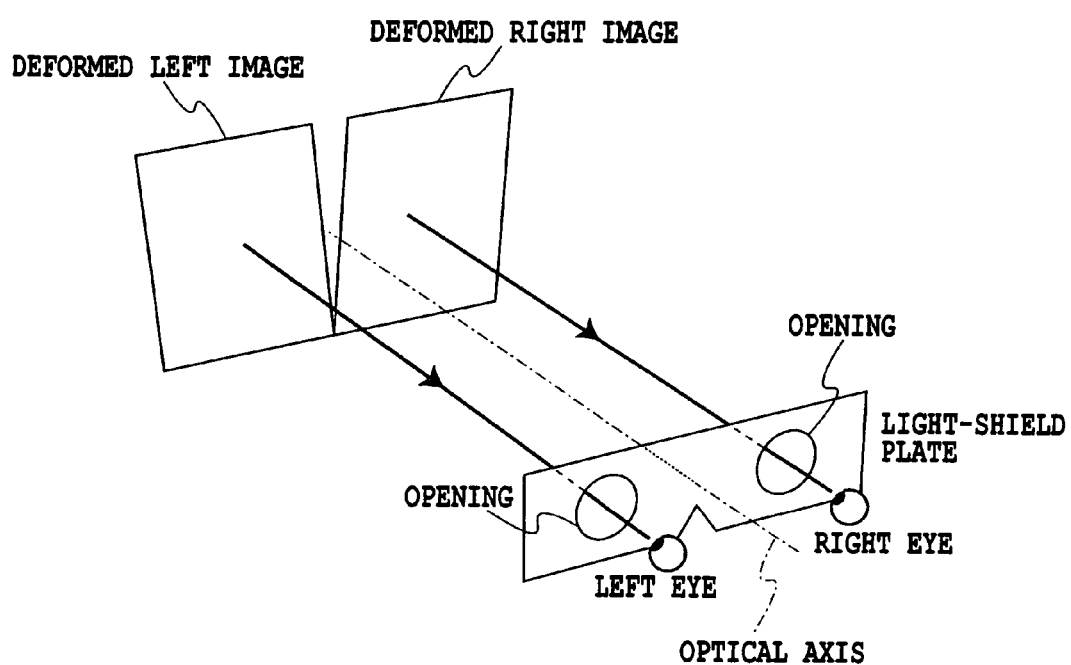
FIG. 22 is a view in which a stereoscopic apparatus s a viewer of a parallel view method.
Figure 23:
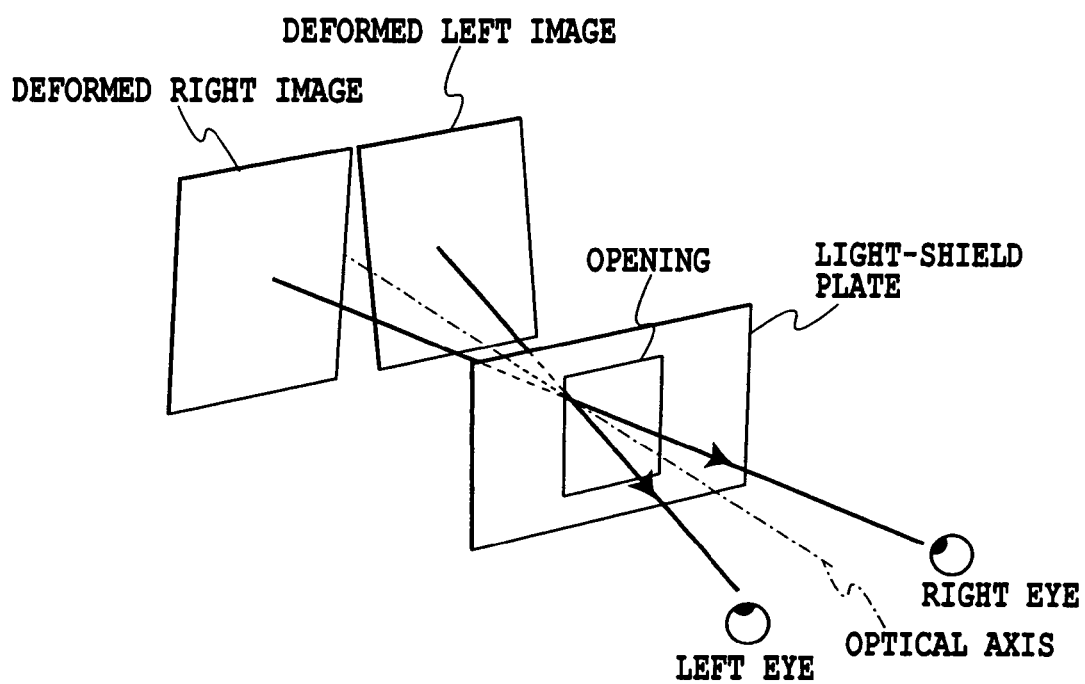
FIG. 23 is a view in which a stereoscopic apparatus is a viewer of a cross view method.

FIGS. 22 and 23 each show a simplest stereoscopic viewer. Both of them are a stereoscopic apparatus that separates the left and right images with a light-shield plate. The stereoscopic apparatus of FIG. 22 is a parallel view method viewer, and the stereoscopic apparatus of FIG. 23 is a cross view method viewer. In the case of the cross view method in FIG. 23, the left and right images are reversed left to right, and hence the deformation direction is opposite to that of the parallel view method. Although the deformed images as shown in FIGS. 22 and 23 are examples of the distortion deformation, they can be made rectangles by trimming.

As existing stereoscopic apparatuses, it is possible to use anaglyph systems, lenticular lens systems, parallax-barrier systems, polarization splitting systems or time-division demultiplexing systems, though not limited to these systems.

Furthermore, as for the stereoscopic images, it is possible to use not only the images on paper such as photographs, but also systems for displaying on a display or screen. In this case, such a configuration is also possible which inputs the original images into the foregoing generating apparatus to make the deformation processing, and displays the stereoscopic images after the processing on the display without change to carry out the stereoscopic vision.

EXAMPLE 2

Figure 14:
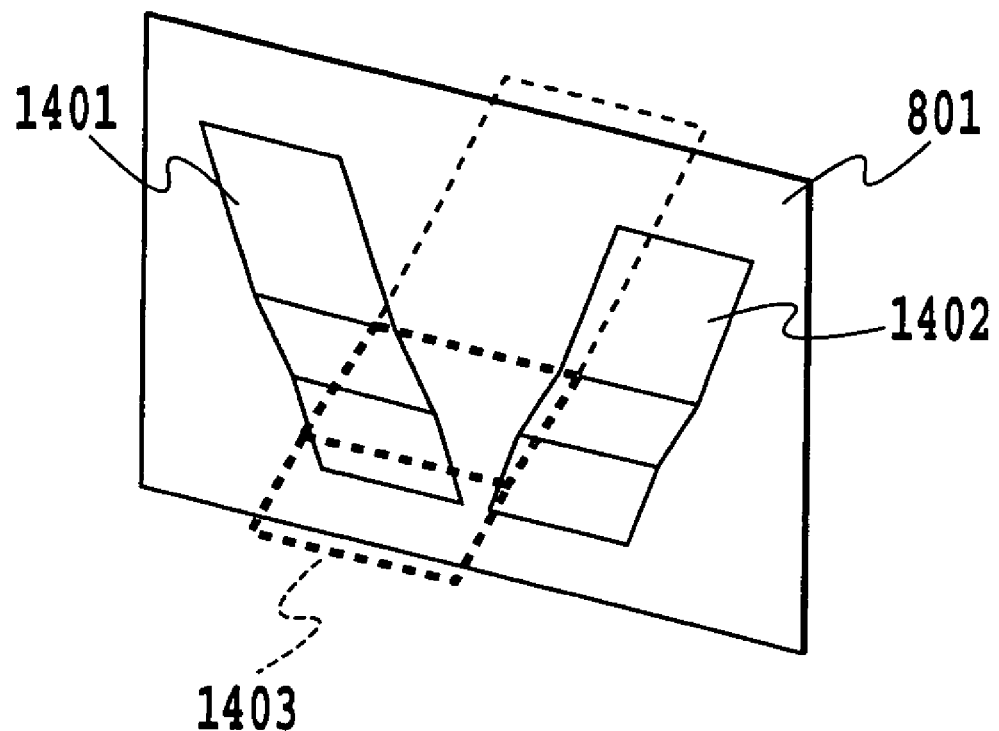
FIG. 14 is a view illustrating an image that undergoes deformation processing of the left and right images in such a manner that an imaginary inclined plane is formed.

In FIG. 13, although the imaginary inclined plane is a plane having a rather simple slope, the imaginary inclined plane is not limited to it as described above. A variety of imaginary inclined planes are conceivable according to the characteristics of the images taken or generated. For example, as shown in FIG. 14, it is possible to generate left and right images 1401 and 1402 by making such deformation processing that changes the imaginary inclined angle halfway, thereby producing an imaginary inclined plane 1403 with a stair-step appearance.

EXAMPLE 3

Figure 15:
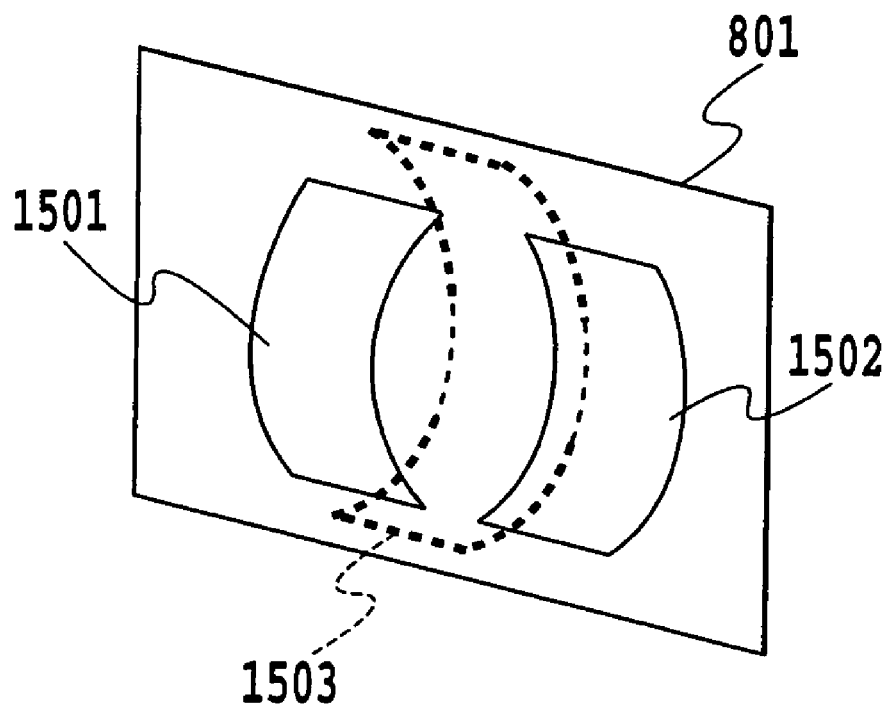
FIG. 15 is a view illustrating an image that undergoes deformation processing of the left and right images in such a manner that an imaginary inclined plane is formed.

As shown in FIG. 15, the imaginary inclined plane 1503 can be made a curved plane. As in FIG. 15, the original left and right images before deformation are deformed on a line unit basis of the pixels to generate deformed left and right images 1501 and 1502. Although the distortion deformation mentioned before is carried out to deform a chunk of lines of pixels, fine deformation is carried out by moving each line in the horizontal direction. For example, as for the deformed left and right images 1501 and 1502, the deformation is made in such a manner that the individual pixel lines are moved in a direction that they are most separated apart at the center, and are brought closer to each other at the upper and lower portions so that the top and bottom ends becomes closest.

As a result, the imaginary inclined plane 1503 has a concave shape at the center, thereby being able to imitate the sky. The curved imaginary inclined plane 1503 can have a convex shape at the center or at the upper portion. The convex shape at the center achieves an effect similar to the lens effect. For example, the deformation processing as shown in FIG. 15 is effective to form an imaginary inclined plane on which the neighborhood of the horizon is located at the deepest position when the video contents includes the horizon.

EXAMPLE 4

Figure 16:
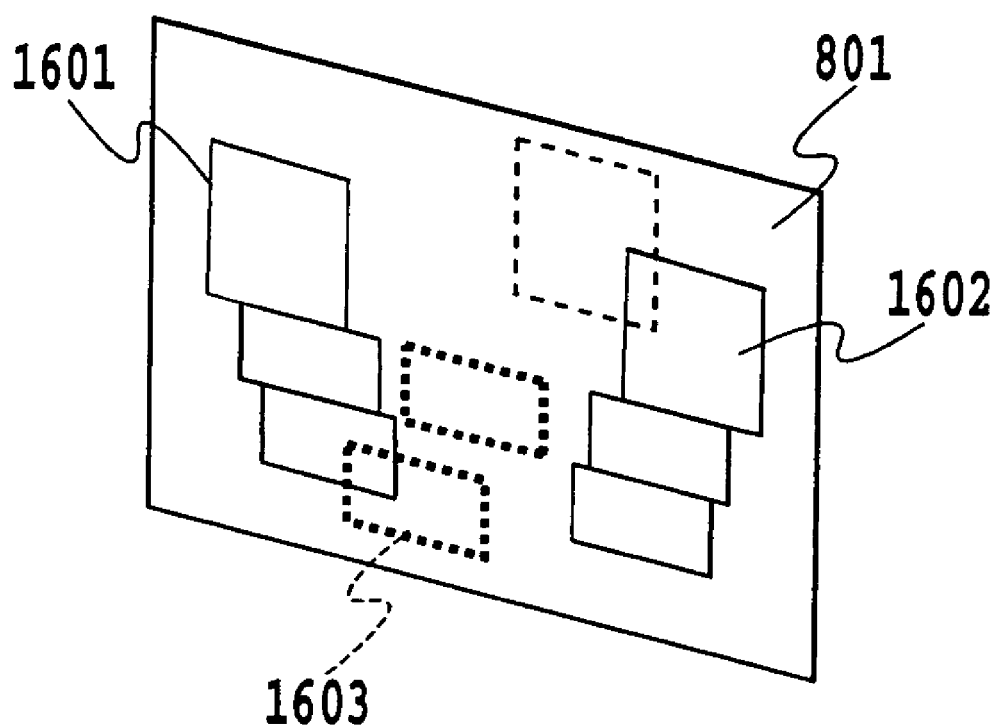
FIG. 16 is a view illustrating an image that undergoes deformation processing of the left and right images in such a manner that an imaginary inclined plane is formed.

By distributing the at-observation video vergence angles on the imaginary inclined plane formed in this way, it is possible to generate a total vergence angle space that gives a sense of greater depth. However, as shown in FIG. 16, it is also possible to form an imaginary inclined plane 1603 with unflat elevation changes for the inclined plane in its entirety. The deformation processing of the images to generate a variety of imaginary inclined planes can be implemented easily using the existing image processing software as described above. However, regardless of the concrete contents of the deformation processing, it is obvious that the method and apparatus of improving the three-dimensional effect by generating the imaginary inclined plane fall within the scope of the present invention.

EXAMPLE 5

Figure 17:
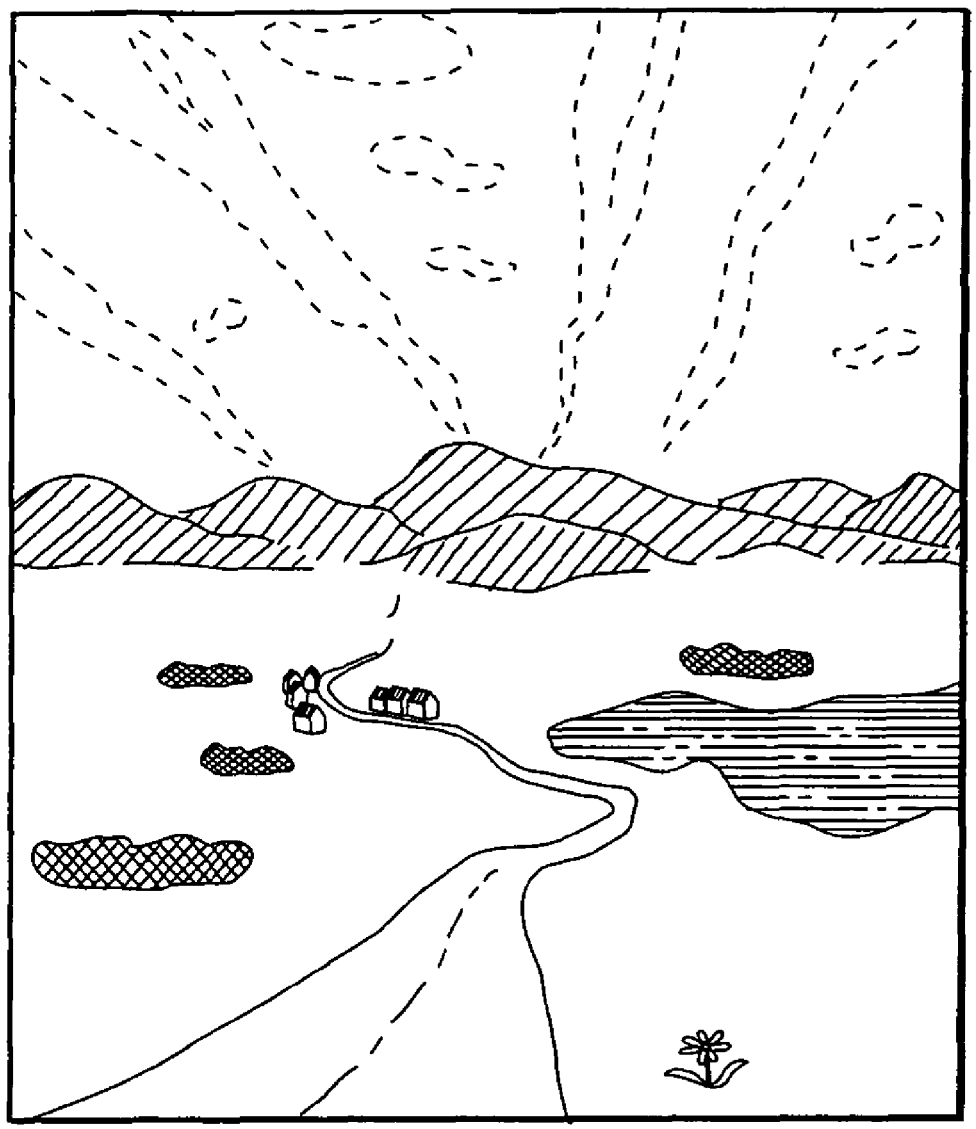
FIG. 17 is a view showing a photograph taken by a person standing on the ground without any particular action.

Further studying the application of the imaginary inclined plane specifically, the deformation processing is conceivable which is suitable for the image as shown in FIG. 17. FIG. 17 is a view showing an example of a photograph taken by a person standing on the ground without any artificial operation. The lower portion of the photograph becomes feet, and from the lower to middle portion of the photograph shows a plane in the depth direction of the horizon. The portion above the horizon of the photograph shows the sky and clouds coming from the horizon portion toward the observer.

Figure 18:
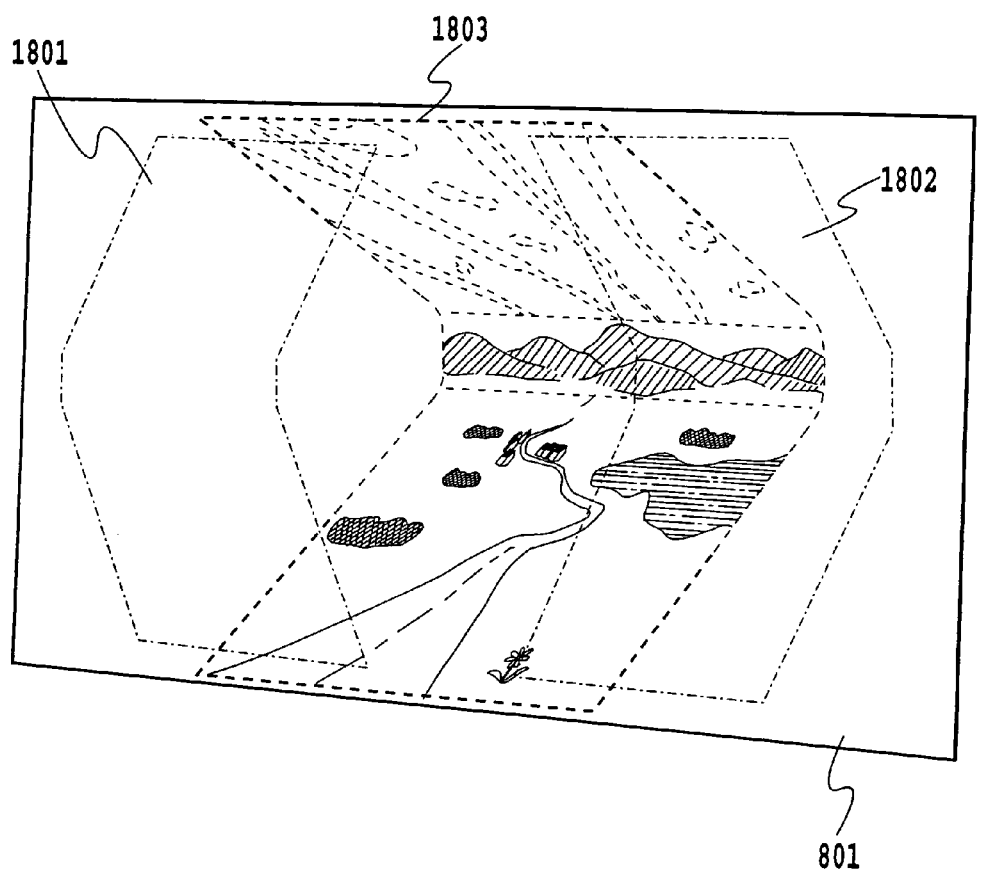
FIG. 18 is a view illustrating an imaginary inclined plane effective to bring out such an effect.

To generate the stereoscopic images from such a landscape, it is necessary to take the image as left and right images with parallax. Generally, to perceive a vigorous stereoscopic image using the stereoscopic left and right photographs, the photographic base length must be made long. However, applying the present invention to the image deformation processing to generate the imaginary inclined plane as shown in FIG. 18, the sense of depth can be exaggerated by the present invention without much increasing the photographic base length. FIG. 18 is a view illustrating an imaginary inclined plane serving to derive such an effect. It is enough to generate an imaginary inclined plane 1803 in such a manner that the neighborhood of the horizon portion becomes deepest.

To achieve this, the image deformation is carried out as follows in the parallel view method. As shown in FIG. 18, pixel lines of the left and right images 1801 and 1802 are separated most in the neighborhood of the horizon portion (that is, made equal to the distance between the two eyes) Pixel lines in the top and bottom portions in the image are brought closest to each other in such a manner that the intermediate pixel lines are changed continuously. As for the portions corresponding to the ground and the sky, they are provided with the linearly changing distortion deformation. Although FIG. 18 shows the image in the imaginary inclined plane, it does not show the stereoscopic images, but shows an image only to illustrate the shape of the imaginary inclined plane 1803. The stereoscopic images are formed in the space on this side of or at the back of the imaginary inclined plane 1803.

EXAMPLE 6

It is also possible to display applying this forth embodiment to a screen inclined objectively in the depth direction or in the right or left direction. In this case, images displayed on a sloped screen inclined plane are images passing through projective transformation. When carrying out the projective transformation by projecting the left and right images on the inclined screen for displaying the left and right images, the imaginary inclined plane can be formed by setting the reference point of the projection at the position separated from the eyepoint on the line connecting the left and right eyepoints rather than at the neighborhood of the respective eyepoints.

Fifth Embodiment

Figure 19:
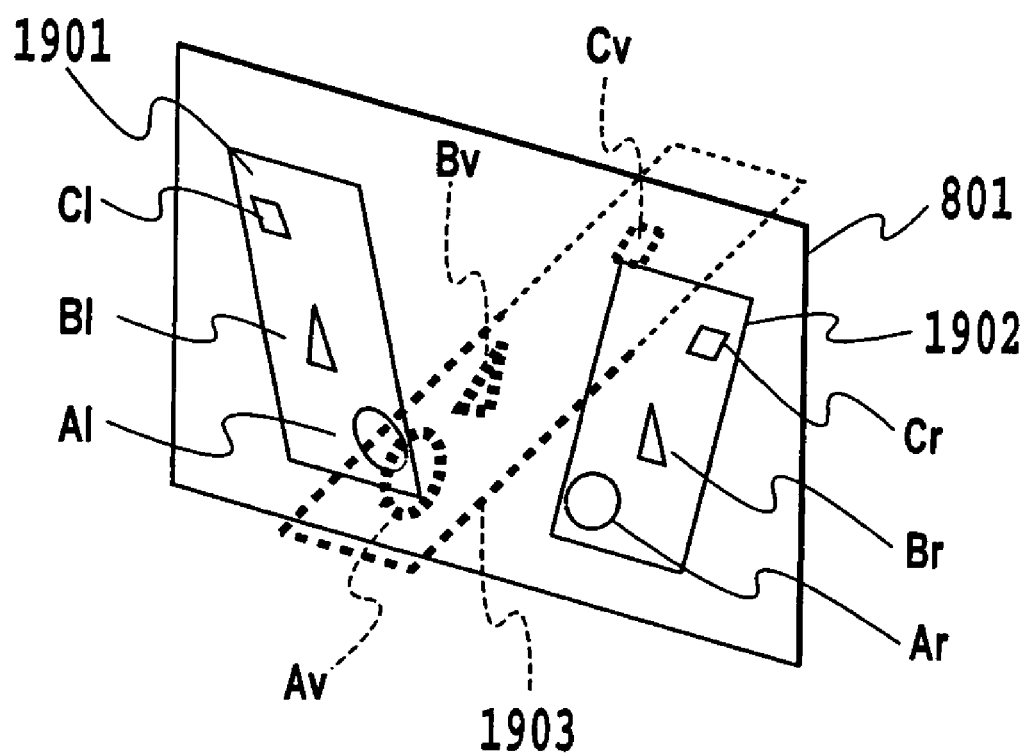
FIG. 19 is a view illustrating an image that undergoes deformation processing of the left and right images in such a manner that an imaginary inclined plane is formed.

In FIG. 19, subjects A, B and C are placed at positions Al, Bl and Cl in the left image, and at positions Ar, Br and Cr in the right image. These positions (Al, Bl, Cl, Ar, Br, Cr) are integrated with the bases of the left and right images, respectively. The left image 1901 and right image 1902 are subjected to the distortion deformation processing in such a manner that the upper portions of the left and right images are separated from each other. Through the image deformation processing, the base vergence angle space, that is, the lower portion of the imaginary inclined plane 1903 becomes an uphill standing out toward the observer. This is the same as in the case of FIG. 13.

At the same time, the video vergence angle space according to the video images of the subjects represented on the left and right images 1901 and 1902 are deformed with their upper portions being inclined. Since the at-observation video vergence angles of the virtual subjects Av, subject Bv and subject Cv formed at the fused points of the left and right images 1901 and 1902 are distributed and formed between the lower side and upper side of the imaginary inclined plane 1903, they become total vergence angles with an increased sense of depth, thereby forming a total vergence angle space whose three-dimensional effect is increased. Although the virtual subjects Av, Bv and Cv perceived through the fusing have their upper portions inclined, as long as the range of the inclination is small, the image observed from the eyepoints are perceived normally. This is because human beings have psychological characteristics of being unable to recognize impossible shapes, and ignore impractical distortion in every day life because they recognize with reference to every day perceptions. In this case also, the sensory depth cue plays an important role.

In this way, it is possible to form the base vergence angles (base vergence angle space) which are deep in the depth direction by deforming the left and right images for the stereoscopic vision displayed on the display plane. Since the video vergence angle space inherent in the video images is formed in the region of the base vergence angle space, the total vergence angle space according to the total vergence angles which are the sum totals of the base vergence angles becomes a virtual space that is deep in the depth direction.
(Contradiction in Stereoscopic Vision)

Although the virtual subjects Av, Bv and Cv are placed in approximately parallel with the imaginary inclined plane 1903 in the forward and backward directions in the present embodiment, there are some different cases. For example, assume that the virtual subject Cv as shown in FIG. 19 is a subject on this side. In this case, since the virtual subject Cv is located at a deep portion of the imaginary inclined plane 1903 shown by broken lines in FIG. 19, even if the video vergence angle of the virtual subject Cv is large, the total vergence angle becomes small because of the effect of the base vergence angle of the imaginary inclined plane. Consequently, making a decision as to the virtual position in the stereoscopic vision according to the vergence angle only will provide a deeper location than the original position.

This fact is contradictory to the original video contents. When the imaginary inclined plane is contradictory to the actual position of the subject at a particular position, the contradiction is subjected to the general decision in a cerebrum. Thus, the contradiction is decided considering the sensory depth cues such as the hidden and overlapped relationship (a back subject is hidden by a front subject), one of the sensory stereoscopic factors of the stereoscopic vision, and the constancy of the size (a larger subject comes front). In other words, the human beings judge visual world according to the every data "visual common sense", and perceive the three-dimensional effect beyond the optical, geometrical explanations. As a result, if a back subject is located on this side of an overlap and conceals part of the rear object, seems larger, or is visible more clearly in the virtual space, these factors are subjected to a general judge so that even if the vergence angle differ to some extent, most human feel that it is placed on this side. Thus, the contradiction is negated in this case.

In the first place, the effective range of the recognition of the three-dimensional position by the vergence angle is said to be about 20 meters. In addition, there is a report that the effect of the vergence angle is lost below 33'. Accordingly, it is impossible to stereoscopically recognize the remote by the vergence angle only. Thus, the present invention is strong in such images as landscapes that form the imaginary inclined plane in which the video contents are proportional to the forward and backward positions. In other words, the present invention is suitable for look-down and look-up images.

Sixth Embodiment

The imaginary inclined angles can be formed by placing completely identical images at the left and right as the stereoscopic left and right images, and by carrying out the deformation processing. In this case, a pseudo stereoscopic vision is achieved using a single two-dimensional image. The total vergence angle in this case is equal to the base vergence angle because the video vergence angle is zero.

For example, in the case of the landscape photograph, the lower portion of the photograph is the front (near) position of an observer in a real space, and the upper portion of the photograph is a deep (distant) position from the observer in the real space. In this case, the vergence angle of the observer is large in the front (near region) and reduces as proceeding toward the depth (remote region).

When the imaginary inclined angles are formed by using the identical images at the left and right as the stereoscopic left and right images, and by carrying out the deformation processing described in the example 2, a total vergence angle space similar to the real space is generated.

For example, when a photographic image includes a plain, mountains at its back, and clouds over the mountains, it is preferable to generate an imaginary inclined angle space in which the plain portion is provided with a great inclined angle, the mountains with a mild inclined angle, and the clouds with an opposite inclined angle standing out to the front (it is the same for an image having the parallax). However, since there is no video vergence angle, when the video and vergence angles are contradictory, the sensory depth cue has large effect.

Although the present embodiment is a pseudo stereoscopic vision after all, it offers a great advantage of being able to use an existing image without change at low cost, thereby enabling using past resources. In this way, the present embodiment can create a sense of a three-dimensional effect by increasing the imaginary inclined angle, and by forming an imaginary inclined plane similar to the video contents, even if the parallax of the left and right images is small.

INDUSTRIAL APPLICABILITY

The present invention can mitigate the binocular rivalry involved in the stereoscopic vision, thereby being able to reduce the fatigue of the observer.

The invention claimed is:

1. A method for generating a stereoscopic image set of images having a left image and a right image for stereoscopic vision by a stereoscopic image generating apparatus, said method comprising:
   a region extraction step of extracting left and right target regions which do not include a pair of fused points corresponding to each other in the left image and the right image and identifying a more unclear region between the left and right target regions; and
   a region processing step of carrying out processing of generating the stereoscopic image set of images so as to make the region identified in the region extraction step even more unclear than the remaining regions of the target regions.

2. A method for generating a stereoscopic image set of images having a left image and a right image for stereoscopic vision by a stereoscopic image generating apparatus, said method comprising:
   a region extraction step of extracting left and right regions which do not include fused points corresponding to each other in the left image and the right image which are displayed on a display plane; and
   a region processing step of carrying out processing of generating the stereoscopic image set of images so as to make the regions extracted in the region extraction step even more unclear than the remaining regions of the regions.

3. The method as claimed in claim 1, wherein the processing of generating the stereoscopic image set of images is a processing of blurring the region identified in the region extraction step.

4. The generating method as claimed in claim 2, wherein the processing of generating the stereoscopic image set of images is a processing of blurring the region identified in the region extraction step.

5. The method as claimed in claim 1, wherein the processing of generating the stereoscopic image set of images is a processing of reducing contrast of the region identified in the region extraction step.

6. The method as claimed in claim 2, wherein the processing of generating the stereoscopic image set of images is a processing of reducing contrast of the region identified in the region extraction step.

7. The method as claimed in claim 1, wherein the processing of generating the stereoscopic image set of images is a processing of reducing saturation or brightness of the region identified in the region extraction step.

8. The method as claimed in claim 2, wherein the processing of generating the stereoscopic image set of images is a processing of reducing saturation or brightness of the region identified in the region extraction step.

9. The generating method as claimed in claim 1, wherein the processing of generating the stereoscopic image set of images is a processing of bringing a hue of the region identified in the region extraction step to a cold color family.

10. The method as claimed in claim 2, wherein the processing of generating the stereoscopic image set of images is a processing of bringing a hue of the region identified in the region extraction step close to a cold color family.

11. The method as claimed in claim 1, wherein the processing of generating the stereoscopic image set of images is a processing of bringing a hue, saturation or brightness of the region identified in the region extraction step close to a hue, saturation or brightness of the remaining regions of the target regions.

12. A method for producing a stereoscopic image set of images having a left image and a right image for stereoscopic vision, the stereoscopic image set of images being processed so as to make a more unclear region between left and right target regions which do not include fused points corresponding to each other in the left image and the right image which are displayed on a display plane even more unclear than the remaining regions of the target regions.

13. The method as claimed in claim 1, wherein the processing of generating the stereoscopic image set of images so as to make more unclear is one of or a combination of the following processings:
   (1) processing of blurring the region;
   (2) processing of reducing contrast of the region identified in the region extraction step;
   (3) processing of reducing saturation or brightness of the region identified in the region extraction step;
   (4) processing of bringing a hue of the region identified in the region extraction step close to a cold color family; and
   (5) processing of bringing a hue, saturation or brightness of the region identified in the region extraction step close to a hue, saturation or brightness of the remaining regions of the target regions.

14. The method as claimed in claim 2, wherein the processing of generating a stereoscopic image set of images is one of or a combination of the following processings:
   (1) processing of blurring the region identified in the region extraction step;

(2) processing of reducing contrast of the region identified in the region extraction step;
(3) processing of reducing saturation or brightness of the region identified in the region extraction step;
(4) processing of bringing a hue of the region identified in the region extraction step close to a cold color family; and
(5) processing of bringing a hue, saturation or brightness of the region identified in the region extraction step close to a hue, saturation or brightness of the remaining regions of the target regions.

15. A stereoscopic image generating apparatus for generating a stereoscopic image set of images having a left image and a right image for stereoscopic vision, said stereoscopic image generating apparatus comprising:
   region extraction means of extracting left and right target regions which do not include a pair of fused points corresponding to each other in the left image and the right image and identifying a more unclear region between the left and right target regions; and
   a region processing means for carrying out processing of generating the stereoscopic image set of images so as to make the region identified in the region extraction step even more unclear than the remaining regions of the target regions.

16. A stereoscopic image generating apparatus for generating a stereoscopic image set of images having a left image and a right image for stereoscopic vision, said stereoscopic image generating apparatus comprising:
   a region extraction means of extracting left and right regions which do not include fused points corresponding to each other in the left image and the right image which are displayed on a display plane; and
   a region processing means of carrying out processing of generating the stereoscopic image set of images so as to make the regions extracted in the region extraction step even more unclear than the remaining regions of the regions.

17. A stereoscopic viewing method of watching a stereoscopic image set of images having a left image and a right image for stereoscopic vision by a stereoscopic image generating apparatus, said stereoscopic viewing method comprising:
   a region extraction step of extracting left and right target regions which do not include a pair of fused points corresponding to each other in the left image and the right image and identifying a more unclear region between the left and right target regions; and
   a region processing step of carrying out processing of generating the stereoscopic image set of images so as to make the region identified in the region extraction step even more unclear than the remaining regions of the target regions.

18. A method for generating a stereoscopic image set of images having a left image and a right image for stereoscopic vision by a stereoscopic image generating apparatus, said stereoscopic viewing method comprising:
   a region extraction step of extracting left and right regions which do not include fused points corresponding to each other in the left image and the right image which are displayed on a display plane; and
   a region processing step of carrying out processing of generating the stereoscopic image set of images so as to make the processed regions extracted in the region extraction step even more unclear than the remaining regions of the regions.

19. A stereoscopic viewing apparatus for showing a stereoscopic image set of images having a left image and a right image for stereoscopic vision, said stereoscopic viewing apparatus comprising:
   region extraction means of extracting left and right target regions which do not include a pair of fused points corresponding to each other in the left image and the right image and identifying a more unclear region between the left and right target regions; and
   a region processing means for carrying out processing of generating the stereoscopic image set of images so as to make the region identified in the region extraction step even more unclear than the remaining regions of the target regions.

20. An apparatus for generating a stereoscopic image set of images having a left image and a right image for stereoscopic vision, said apparatus comprising:
   a region extraction means of extracting left and right regions which do not include fused points corresponding to each other in the left image and the right image which are displayed on a display plane; and
   a region processing means of carrying out processing of generating a stereoscopic image set of images so as to make the regions extracted in the region extraction step even more unclear than the remaining regions of the regions.

21. A non-transitory computer readable medium storing a program for controlling a apparatus for generating a stereoscopic image set of images having a left image and a right image for stereoscopic vision, said program causing a stereoscopic image generating apparatus to execute:
   a region extraction step of extracting left and right target regions which do not include a pair of fused points corresponding to each other in the left image and the right image and identifying a more unclear region between the left and right target regions; and
   a region processing step of carrying out processing of generating the stereoscopic image set of images so as to make the region identified in the region extraction step even more unclear than the remaining regions of the target regions.

22. A non-transitory computer readable medium storing a program for controlling an apparatus for generating a stereoscopic image set of images having a left image and a right image for stereoscopic vision, said program causing said stereoscopic image generating apparatus to execute:
   a region extraction step of extracting left and right regions which do not include fused points corresponding to each other in the left image and the right image which are displayed on a display plane; and
   a region processing step of carrying out processing of generating the stereoscopic image set of images so as to make the regions extracted in the region extraction step even more unclear than the remaining regions of the regions.

23. A method for generating a stereoscopic image set of images which has a left image and a right image for stereoscopic vision, and forms a virtual stereoscopic image by vergence angles generated from individual points corresponding in the left image and the right image by a stereoscopic image generating apparatus, said method comprising:
   a region extraction step of extracting left and right target regions which do not include a pair of fused points corresponding to each other in the left image and the right image and identifying a more unclear region between the left and right target regions;

a region processing step of carrying out processing of generating the stereoscopic image set of images so as to make the region identified in the region extraction step even more unclear than the remaining regions of the target regions; and a vergence angle modifying step of increasing a stereoscopic effect by carrying out deformation processing of a left image and a right image of a stereoscopic image set of images which are prepared in advance to form the virtual stereoscopic image, by increasing or decreasing the vergence angles generated by the individual points of the stereoscopic image set of images according to a prescribed rule, and by altering a depth of the virtual stereoscopic image.

24. A method for generating a stereoscopic image set of images which has a left image and a right image for stereoscopic vision, and forms a virtual stereoscopic image by vergence angles generated from individual points corresponding in the left image and the right image by a stereoscopic image generating apparatus, said method comprising:

a region extraction step of extracting left and right regions which do not include fused points corresponding to each other in the left image and the right image which are displayed on a display plane;

a region processing step of carrying out processing of generating the stereoscopic image set of images so as to make the regions extracted in the region extraction step even more unclear than the remaining regions of the regions; and a vergence angle modifying step of increasing a stereoscopic effect by carrying out deformation processing of a left image and a right image of a stereoscopic image which are prepared in advance to form the virtual stereoscopic image, by increasing or decreasing the vergence angles generated by the individual points of the stereoscopic image set of images according to a prescribed rule, and by altering a depth of the virtual stereoscopic image.

25. The method as claimed in claim 1, wherein the unclear region comprises at least one of being out of focus, low contrast, running and sober tones.

26. The method for producing the stereoscopic image set of images as claimed in claim 12, wherein the unclear region comprises at least one of being out of focus, low contrast, running and sober tones.

27. The stereoscopic image generating apparatus as claimed in claim 15, wherein the unclear region comprises at least one of being out of focus, low contrast, running and sober tones.

28. The stereoscopic viewing method as claimed in claim 17, wherein the unclear region comprises at least one of being out of focus, low contrast, running and sober tones.

29. The stereoscopic viewing apparatus as claimed in claim 19, wherein the unclear region comprises at least one of being out of focus, low contrast, running and sober tones.

30. The non-transitory computer readable medium as claimed in claim 21, wherein the unclear region comprises at least one of being out of focus, low contrast, running and sober tones.

31. The method as claimed in claim 23, wherein the unclear region comprises at least one of being out of focus, low contrast, running and sober tones.

* * * * *